United States Patent
Oka et al.

(10) Patent No.: US 10,177,694 B2
(45) Date of Patent: Jan. 8, 2019

(54) CURRENT SENSOR ABNORMALITY DIAGNOSIS DEVICE

(71) Applicant: DENSO CORPORATION, Kariya, Aichi-pref. (JP)

(72) Inventors: Atsuko Oka, Kariya (JP); Shuji Kuramitsu, Kariya (JP); Koichi Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/726,774

(22) Filed: Oct. 6, 2017

(65) Prior Publication Data

US 2018/0102719 A1 Apr. 12, 2018

(30) Foreign Application Priority Data

Oct. 7, 2016 (JP) .................. 2016-199161

(51) Int. Cl.
| | |
|---|---|
| *H02P 27/00* | (2006.01) |
| *H02P 6/12* | (2006.01) |
| *H02P 6/17* | (2016.01) |
| *H02P 21/18* | (2016.01) |
| *H02P 21/22* | (2016.01) |
| *H02P 29/68* | (2016.01) |

(Continued)

(52) U.S. Cl.
CPC .............. *H02P 6/12* (2013.01); *H02P 6/17* (2016.02); *H02P 21/18* (2016.02); *H02P 21/22* (2016.02); *H02P 23/14* (2013.01); *H02P 25/145* (2013.01); *H02P 27/085* (2013.01); *H02P 29/68* (2016.02)

(58) Field of Classification Search
CPC ...... H02P 1/00; H02P 3/00; H02P 6/00; H02P 6/14; H02P 1/46; H02P 3/18; H02P 27/04; H02P 27/06; H02P 23/00; H02P 27/00; H02P 27/08; H02P 29/027; H02K 11/21; H02K 11/27
USPC ............ 318/400.01, 400.02, 400.14, 400.15, 318/400.26, 599, 700, 701, 727, 779, 799, 318/800, 801, 430, 432, 437, 434, 716, 318/717, 500, 512; 700/143, 177, 293; 180/214, 65.1, 65.21, 65.51
See application file for complete search history.

(56) References Cited

U.S. PATENT DOCUMENTS

2009/0133947 A1    5/2009  Yoshihara et al.
2017/0310265 A1*  10/2017  Matsuura ............. H02H 7/0805

FOREIGN PATENT DOCUMENTS

JP    H06-253585    9/1994

\* cited by examiner

*Primary Examiner* — Antony M Paul
(74) *Attorney, Agent, or Firm* — Knobbe, Martens, Olson & Bear, LLP

(57) ABSTRACT

In a current sensor abnormality diagnosis device, an abnormality judgment section determines that the phase current sensors are operating normally when a sum of three phase currents is not more than a threshold value, and a bus current sensor is operating normally based on a comparison result between three phase currents and a bus current. The abnormality judgment section detects which the phase current sensor has failed based on the three phase currents and the bus current when the sum of the three phase currents is more than the threshold value. Because of using the comparison results of the three phase currents with the bus current in addition to the sum of the three phase currents, it is possible for the abnormality judgment section to detect the occurrence of abnormality of each of these current sensors even if the detected current has an undefined value.

14 Claims, 18 Drawing Sheets

(51) Int. Cl.
*H02P 23/14* (2006.01)
*H02P 25/14* (2006.01)
*H02P 27/08* (2006.01)

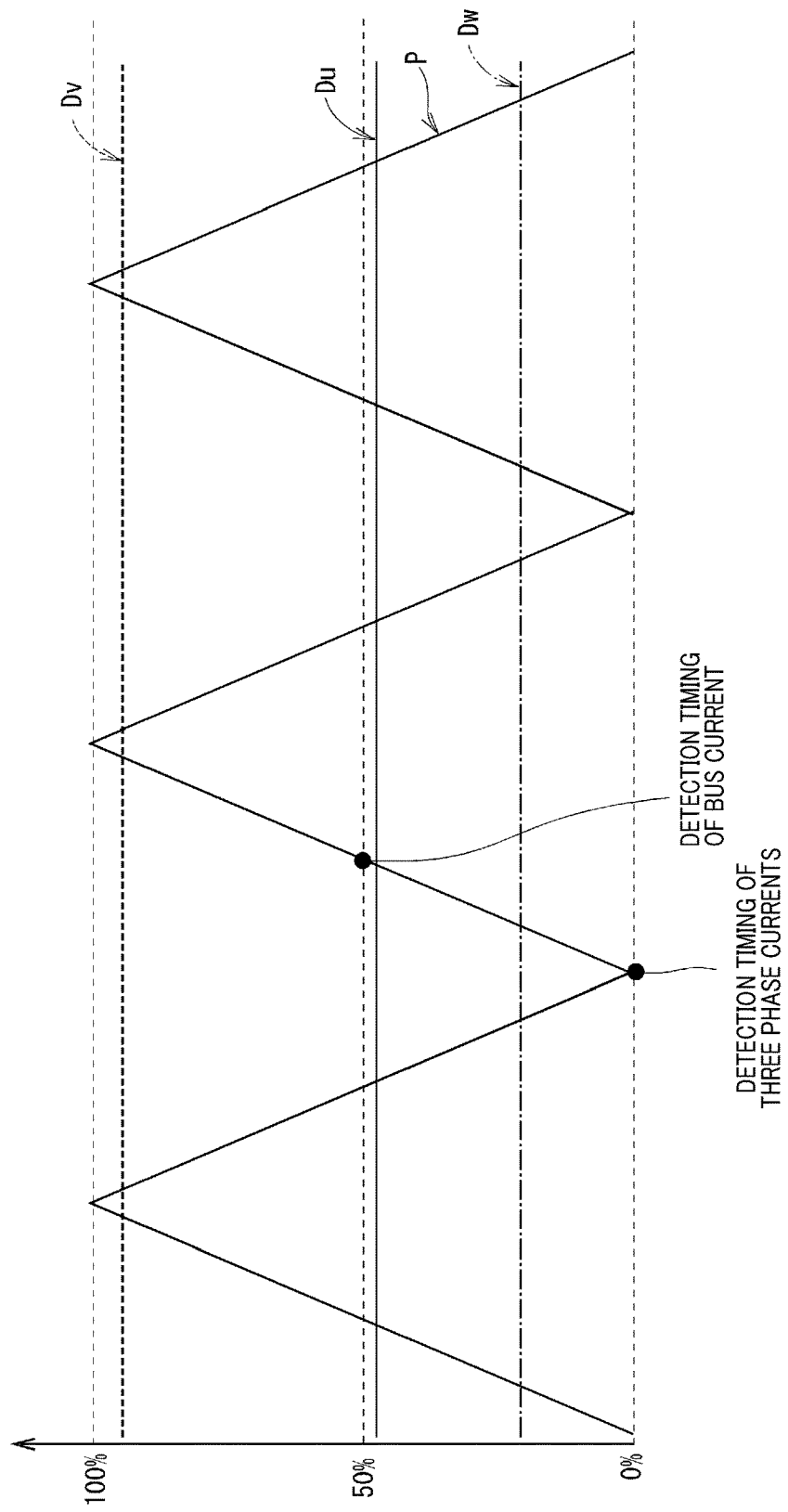

CURRENT SENSOR ABNORMALITY DIAGNOSIS DEVICE

CROSS-REFERENCE TO RELATED APPLICATION

This application is related to and claims priority from Japanese Patent Application No. 2016-199161 filed on Oct. 7, 2016, the contents of which are hereby incorporated by reference.

BACKGROUND OF THE INVENTION

1. Field of the Invention

The present invention relates to current sensor abnormality diagnosis devices for diagnosing abnormality of a current sensor.

2. Description of the Related Art

There has been known a conventional diagnosis device in a drive system to be applied to multi-phase alternating current motors of not less than three phases. Such a conventional diagnosis device is capable of diagnosing abnormality of each of multiple current sensors. The current sensors detect a current flowing in each phase.

Patent documents 1 and 2, Japanese patent laid open publications No. 2009-131043 and H06-253585, have disclosed such a conventional diagnosis device having a structure which determines occurrence of abnormality of one or more current sensors when a total sum of output values of plural current sensors exceeds a threshold value which has been determined in advance, where these current sensors are provided to three phases of an AC motor, respectively.

The diagnosis device having the structure disclosed in the patent documents 1 and 2 specifies a current sensor in abnormality on the basis of output values of the remaining two current sensors and Kirchhoff's laws when the output value of one of the three current sensors is zero. However, it is difficult for the diagnosis device having the structure disclosed in the patent documents 1 and 2 to correctly specify the current sensor in abnormality when the output value of one of the three current sensors becomes an undefined value due to occurrence of a circuit short of a variable voltage or occurrence of a power source short.

SUMMARY

It is therefore desired to provide a current sensor abnormality diagnosis device capable of detecting and specifying a current sensor in abnormality in plural current sensor for detecting a current in each phase of multiple phases in a multi-phase alternating current motor, and performing a correct control of operation of the multi-phase alternating current motor.

An exemplary embodiment provides a current sensor abnormality diagnosis device capable of detecting occurrence of abnormality of each of phase current sensors and a bus current sensor. The plural phase current sensors detect three phase currents which flow in three phases of a three phase alternating current motor. The bus current sensor detects a bus current which flows in a bus line. One terminal of the bus line is connected to a direct current power source or being earthed. The current sensor abnormality diagnosis device has a computer system which includes a central processing unit. The computer system is configured to provide a current comparison section and an abnormality judgment section. The current comparison section compares a three phase current sum with a predetermined three phase current threshold value, and compares each of the three phase currents with the bus current. The three phase current sum is a sum of the three phase currents. The abnormality judgment section executes abnormality diagnosis of the phase current sensors or the bus current sensor. The abnormality judgment section detects that one of the phase current sensors has failed when the three phase current sum is not more than the predetermined three phase current threshold value. The abnormality judgment section determines whether the bus current sensor is operating normally on the basis of the comparison result of the three phase currents and the bus current. The abnormality judgment section determines that one of the phase current sensor has failed on the basis of the comparison result between the three phase currents and the bus current when the three phase current sum is more than the predetermined three phase current threshold value.

Because the current comparison section compares the sum of the three phase current with the threshold value of the three phase currents, and further compares the three phase currents with the bus current, the abnormality judgment section detects occurrence of abnormality of each of these current sensors and also detects occurrence of the bus current sensor. This makes it possible for the abnormality judgment section to detect various states of abnormality of the phase current sensors and the bus current sensor even if the detected current has an undefined value.

BRIEF DESCRIPTION OF THE DRAWINGS

A preferred, non-limiting embodiment of the present invention will be described by way of example with reference to the accompanying drawings, in which:

FIG. 3 is a view showing a detection timing of a phase current sensor and a detection timing of a bus current sensor in the motor drive system according to the exemplary embodiment shown in FIG. 1;

DETAILED DESCRIPTION OF THE PREFERRED EMBODIMENTS

Figure 1:
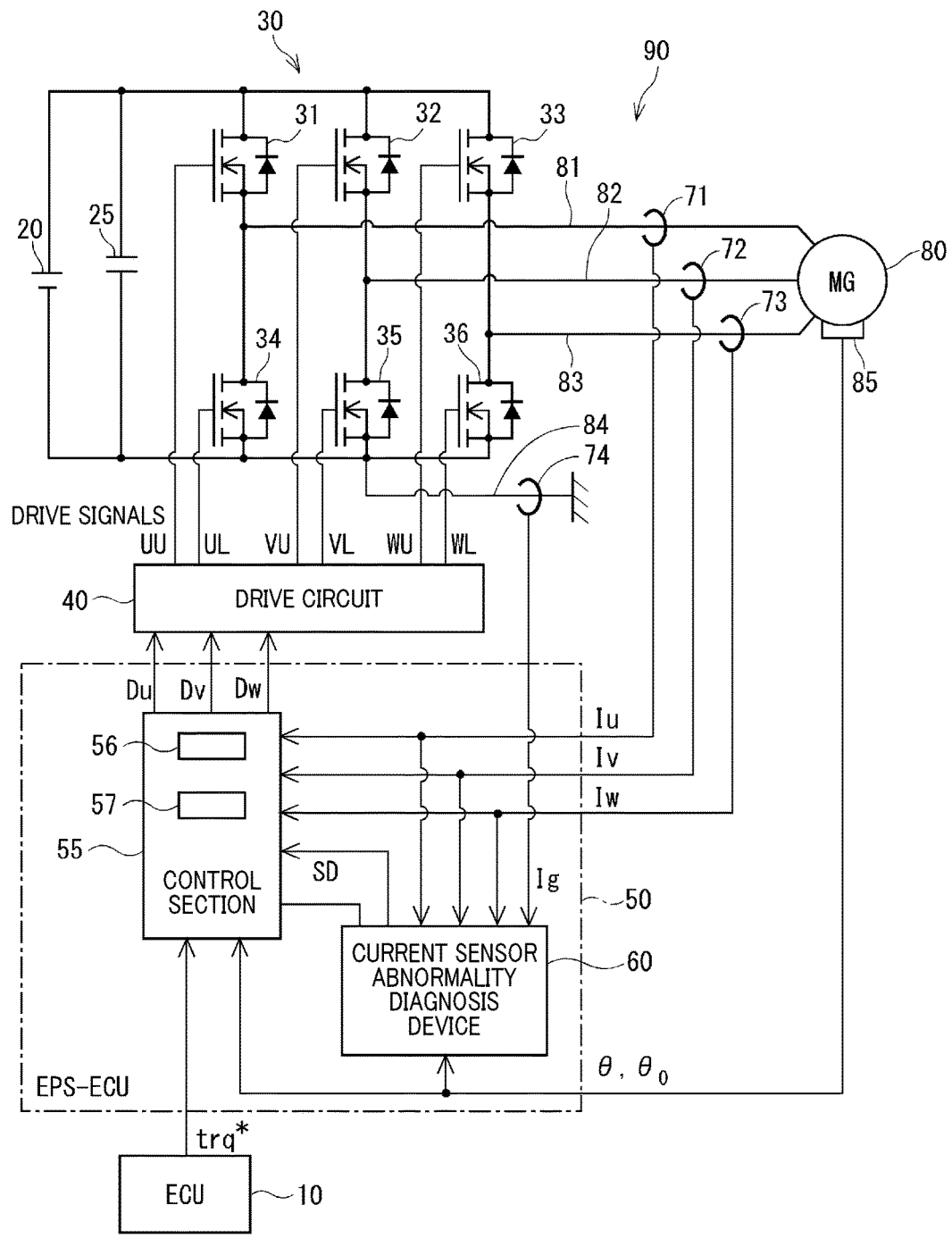
FIG. 1 is a view showing a schematic structure of a motor drive system having a current sensor abnormality diagnosis device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a current sensor abnormality diagnosis device according to an exemplary embodiment with reference to drawings.

FIG. 1 is a view showing a schematic structure of a motor drive system 90 having a current sensor abnormality diagnosis device 60 according to an exemplary embodiment.

For example, it is possible to apply the current sensor abnormality diagnosis device 60 according to the exemplary embodiment to an electric power steering device having the motor drive system 90. The current sensor abnormality diagnosis device 60 detects occurrence of abnormality of phase current sensors 71-73. Each of the phase current sensors 71-73 detects a corresponding phase current which flows from an inverter 30 to a three phase alternating current motor 80 (hereinafter, the three phase AC motor 80) through a corresponding current electrical passage 81, 82 or 83.

A description will now be given of the structure of the motor drive system 90 equipped with the current sensor abnormality diagnosis device 60 according to the exemplary embodiment with reference to FIG. 1.

For example, the motor drive system 90 is mounted on an electric power steering device, and the inverter 30 in the motor drive system 90 converts a direct current power (hereinafter, the DC power) of a direct current battery 20 (hereinafter, the DC battery 20) to a three phase alternating current power Although the exemplary embodiment uses the electric power steering device which is a steering column assist device, it is acceptable to use a rack assist device which transmits rotation power of the three phase AC motor 80 to a rack axis (not shown) of the electric power steering device.

Figure 17:
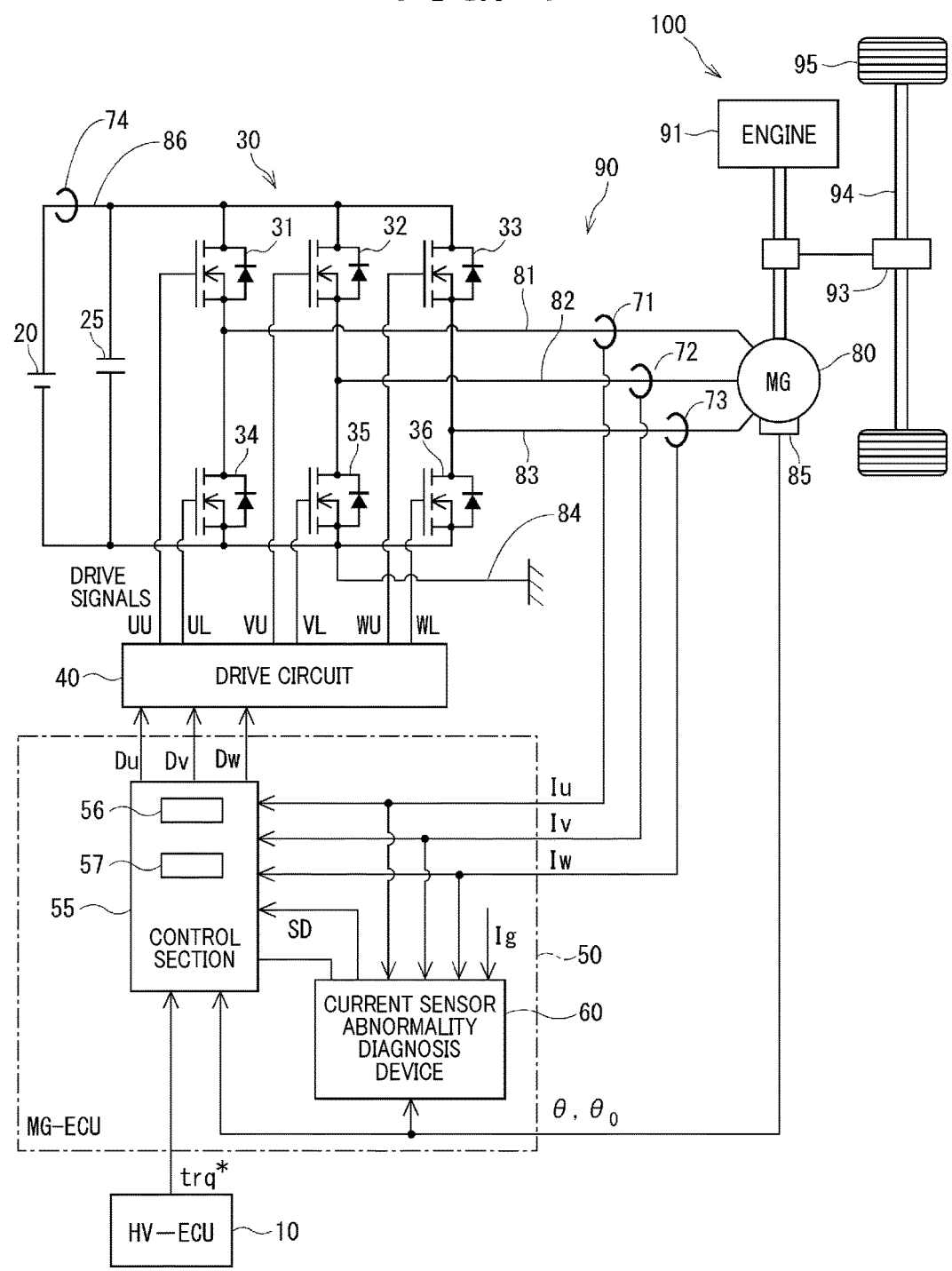
FIG. 17 is a view showing a schematic structure of a motor drive system according to a modification of the exemplary embodiment of the present invention.

The motor drive system 90 supplies three phase AC power to the three phase AC motor 80 to drive. In FIG. 1 and FIG. 17, the three phase AC motor 80 is designated by reference character "MG".

The motor drive system 90 is equipped with the DC battery 20, a smoothing capacitor 25, the inverter 30, the three phase AC motor 80, the phase current sensors 71-73, a bus current sensor 74, a rotation angle sensor 85, an electric control unit (ECU) 10, and an electric power steering-electronic control unit (EPS-ECU) %.

The DC battery 20 is a power source capable of supplying electric power to the three phase AC motor 80 through the inverter 30. The DC battery 20 is a chargeable and rechargeable battery (or a secondary battery) such as a nickel-metal hydride battery, a lithium-ion battery to be connected parallel to the smoothing capacitor 25. It is acceptable to use, as the DC power source, an electric double layer capacitor, etc., instead of using the DC battery 20.

The smoothing capacitor 25 receives the DC power supplied from the DC battery 20, smooths a voltage of the received DC power, and supplies the smoothed DC power to the inverter 30.

As shown in FIG. 1, the inverter 30 is composed of a plurality of switching elements 31-36. In the structure of the inverter 30, the upper side arms 31-33 and the lower side arms 34-36 are connected in a bridge connection. It is possible for the control section 55 of the EPS-ECU 50 to instruct the drive circuit 40 to generate drive signals and to transmit the generated drive signals to the inverter 30 so as to turn on and off each of the switching elements 31-36.

That is, the inverter 30 receives the drive signals UU, VU, WU, UL, VL and WL transmitted from the drive circuit 40, and turns on/off each of the switching elements 31-36 on the basis of the received drive signals UU, VU, WU, UL, VL and WL.

In the inverter 30, the switching elements 31-33 are the upper side switching elements in U phase, V phase and W phase, respectively, and the switching elements 34-36 are the lower side switching elements in U phase, V phase and W phase, respectively. For example, each of the switching elements 31-36 is composed of a metal oxide semiconductor field effect transistor (MOS FET). A freewheel diode is connect with each switching element. This freewheel diode allows a current to flow from a low voltage side to a high voltage side. It is acceptable to use an insulated Gate Bipolar Transistor (IGBT) and a thyristor as each switching element, instead of using a MOS FET.

The AC motor 80 is a permanent magnet synchronous type three phase AC motor, for example. The AC motor 80 generates and supplies a supplemental torque to assist the driver to operate, i.e. to rotate the steering wheel of a vehicle. When receiving the electric power of the DC battery 20 as the power source, the AC motor 80 starts to rotate, and, a reduction gear of the electric power steering device rotates in a forward/reverse direction. The reduction gear reduces a rotation speed of the AC motor 80, and transmits the reduced rotation speed to a steering shaft of the steering wheel.

The AC motor 80 has a stator on which a U phase winding 81, a V phase winding 82, and a W phase winding 83 are wound. The U phase winding 81, the V phase winding 82 and the W phase winding 83 have the same electric characteristics, for example, have the same resistance value. The phase current sensors 71-73 are provided for the U phase winding 81, the V phase winding 82 and the W phase winding 83, respectively. It is acceptable to arrange the phase current sensors 71-73 to wirings of the switching elements 31, 32, 33 at the upper side arm, or to wirings of the switching elements 34, 35, 36 at the lower side arm of the inverter 30.

The bus current sensor 74 is arranged to the bus line 84. One terminal of the bus line 84 is earthed.

The phase current sensors 71-73 detect three phase currents Iu, Iv, Iw, respectively, and transmit detection signals to the control section 55, of the EPS-ECU 50 and the current sensor abnormality diagnosis device 60.

An electric period of each of the three phase currents Iu, Iv, Iw is in inverse proportion to the rotation speed of the AC motor 80. Hereinafter, the phase current sensors 71-73 will also be referred to the U phase current sensor 71, the V phase current sensor 72 and the W phase current sensor 73. That is, the U phase current sensor 71 detects the U phase current Iu, the V phase current sensor 72 detects the V phase current Iv and the W phase current sensor 73 detects the W phase current.

The bus current sensor 74 detects a bus current Ig which flows in the bus line 84. As previously described, one terminal of the bus line 84 is earthed, and the other terminal thereof is connected to the inverter 30 (see FIG. 1). For example, each of the U phase current sensor 71, the V phase current sensor 72, the W phase current sensor 73 and the bus current sensor 74 is composed of a shunt resistance or hall IC.

The rotation angle sensor 85 detects a reference angle $\theta_0$ at a reference timing. For example, the rotation angle sensor 85 is composed of a resolver. In such a resolver, the reference angle $\theta_0$ is determined on the basis of the north marker signal of a R/D converter.

The ECU 10 receives various detection signals such as an acceleration signal, a brake signal, a gear shift signal (or a gear change signal), a vehicle speed signal, and information supplied from other ECUs (not shown). The ECU 10 determines a vehicle state of a vehicle on the basis of the received signals and information, and judges the driving state of the vehicle.

The ECU 10 generates and transmits a torque instruction value trq* to the control section 55 so as to adjust the operation of the AC motor 80. There are various types of ECUs such as an electronic power steering ECU 50 (EPS ECU 50, shown in FIG. 1), a battery ECU, and an engine ECU, etc. That is, the EPS ECU 50 adjusts the operation of the AC motor 80. The battery ECU adjusts the operation of the DC battery 20. The engine ECU adjusts the operation of the engine 91 (see FIG. 17). The battery ECU and the engine control unit are omitted from FIG. 1.

Each of those ECUs is composed of a microcomputer and auxiliary devices. The microcomputer is composed of various components such as a central processing unit (CPU), a read only memory (ROM), a random access memory (RAM), an input/output interface (I/O), and bus lines. Through the bus lines those components are connected together. In each ECU, the CPU executes software control, i.e. executes programs previously stored in the ROM, and adjust the operation of specific electronic circuits as hardware units.

In particular, the EPS ECU 50 shown in FIG. 1 includes the control section 55 and the current sensor abnormality diagnosis device 60 according to the exemplary embodiment.

The control section 55 receives the torque instruction value trq* transmitted from the ECU 10, detection signals regarding three phase currents Iu, Iv and Iw, detection signals regarding the electrical angle $\theta$ or a diagnostic signal SD (hereinafter, the DIAG signal SD). For example, the control section 55 executes a vector control to convert the received three phase current signals Iu, Iv, Iw to a d-q axis current by using the electric angle $\theta$.

The control section 55 executes feedback control of the d-q axis current to current instruction values transmitted from the ECU 10. The control section 55 executes a torque feedback control of an estimated torque value to the torque instruction value trq*. This estimated torque value is calculated based on the d-q axis current.

The control section 55 has a pulse width modulation (PWM) instruction value calculation section 56 and a pulse signal generation section 57. PWM instruction values correspond to a duty value Du for U phase, a duty value Dv for V phase and a duty value Dw for W phase. The PWM instruction values for U phase, V phase and W phase are used to determine electric power to be supplied to the phase windings 81, 82, 83, respectively.

The phase duty values Du, Dv and Dw will also be referred to as the U phase duty value Du, the V phase duty value Dv and the W phase duty value Dw. That is, the U phase duty value Du corresponds to the U phase, the V phase duty value Dv corresponds to the V phase, and the W phase duty value Dw corresponds to the W phase.

The PWM instruction value calculation section 56 adjusts each of the U phase duty value Du, the V phase duty value Dv and the W phase duty value Dw so that the three phase currents Iu, Iv, Iw (which are target values in feedback) become equal with the current instruction values.

The pulse signal generation section 57 generates PWM reference signals P which are triangular pulses corresponding to the U phase duty value Du, the V phase duty value Dv and the W phase duty value Dw.

The control section 55 executes the PWM control so as to adjust the duty of the switching elements 31-36. The switching elements 31-36 are turned on/off on the basis of the PWM control.

The control section 55 transmits the U phase duty value Du, the V phase duty value Dv and the W phase duty value Dw to the drive circuit 40 and the current sensor abnormality diagnosis device 60.

The drive circuit 40 compares each of the U phase duty value Du, the V phase duty value Dv and the W phase duty value Dw with the corresponding PWM reference signal P, generates the drive signals UU, UL, VU, VL, WU and WL, and transmits the generated drive signals UU, UL, VU, VL, WU and WL to the inverter 30. Those generated drive signals UU, UL, VU, VL, WU and WL are transmitted to the corresponding gates of the switching elements 31-36 through a pre-driver, etc.

When receiving the drive signals UU, UL, VU, VL, WU and WL, the switching elements 31-36 are turned on/off on the basis of the received drive signals UU, UL, VU, VL, WU and WL.

A description will now be given of the PWM control executed by the control section 55 with reference to FIG. 2A and FIG. 2B.

Figure 2A:
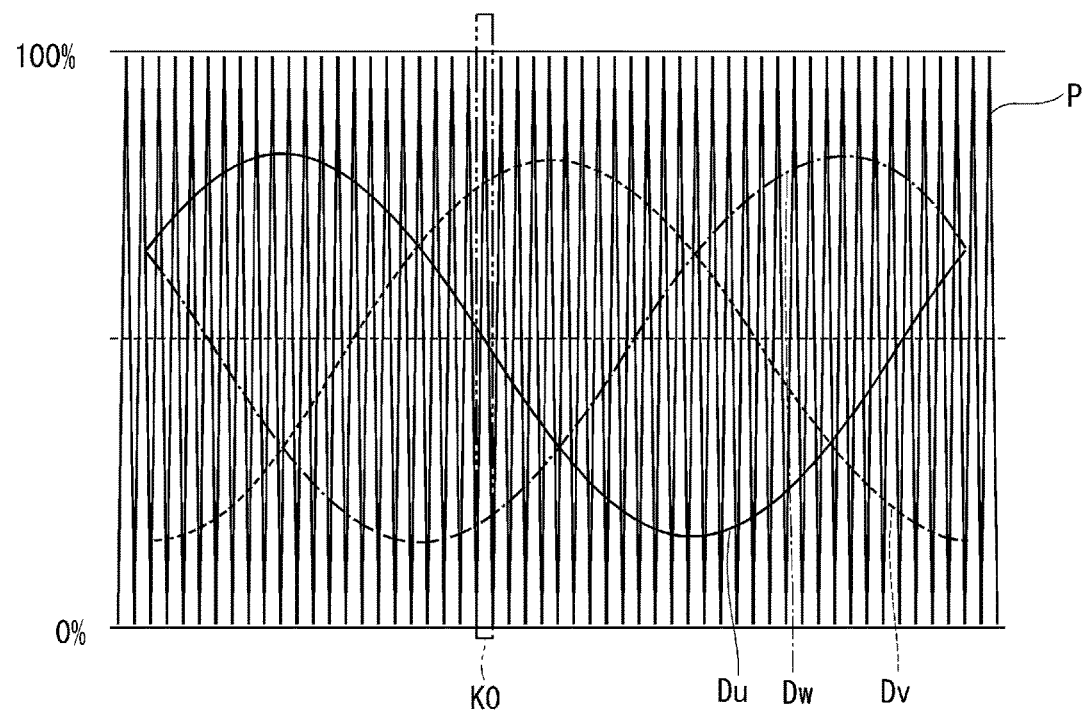
FIG. 2A and FIG. 2B are views explaining a PWM control operation of a control section in the motor drive system having the current sensor abnormality diagnosis device according to the exemplary embodiment shown in FIG. 1.
Figure 2B:
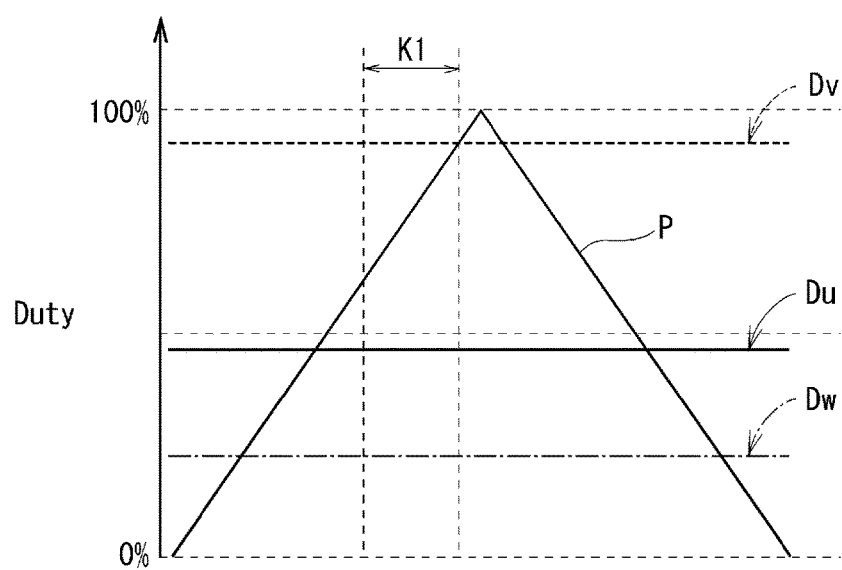

FIG. 2A and FIG. 2B are views explaining the PWM control operation of the control section 55 in the motor drive system having the current sensor abnormality diagnosis device 60 according to the exemplary embodiment shown in FIG. 1. FIG. 2B shows an enlarged view of the section K0 shown in FIG. 2A.

As shown in FIG. 2A, the drive circuit 40 compares each of the U phase duty value Du, the V phase duty value Dv and the W phase duty value Dw with the corresponding PWM reference signal P, and generates the turning on/off signals of the switching elements 31-36.

In FIG. 2A and FIG. 2B, the solid lines represent the U phase duty value Du, the dotted lines represent the V phase duty value Dv, and the long dashed short dashed lines represent the W phase duty value Dw. Each of the U phase duty value Du, the V phase duty value Dv, the W phase duty value Dw and the PWM reference signal P varies within a range of 0 to 100%. However, it is acceptable to vary the range of each of the U phase duty value Du, the V phase duty value Dv, the W phase duty value Dw and the PWM reference signal P.

During a period in which the PWM reference signal P is more than each of the U phase duty value Du, the V phase duty value Dv and the W phase duty value Dw, the switching elements 31-33 are turned off, and the switching elements 34-36 are turned on.

Further, during a period in which the PWM reference signal P is less than each of the U phase duty value Du, the V phase duty value Dv and the W phase duty value Dw, the switching elements 31-33 are turned on, and the switching elements 34-36 are turned off.

As shown in FIG. 2B, during the period K, the PWM reference signal P is lower than the V phase duty value Dv, and higher than the U phase duty value Du and the W phase duty value Dw. That is, during the period K, the switching element 32 in V phase is turned on, and the switching element 35 in V phase is turned off. Further, during the period K, the switching element 31 in U phase is turned off, and the switching element 34 in U phase is turned on, the switching element 33 in W phase is turned off, and the switching element 36 in W phase is turned on.

The current sensor abnormality diagnosis device 60 executes the diagnosis, i.e. detects whether each of the phase sensors 71-73 or the bus current sensor 74 is not operating normally, i.e. has failed.

Further, the current sensor abnormality diagnosis device 60 transmits detection results, i.e. the state of each of the phase sensors 71-73 or the state of the bus current sensor 74 to the control section 55.

The phase sensors 71-73 and the bus current sensor 74 have a different fixed detection timing, respectively.

In the exemplary embodiment, the PWM reference signal P of being 0% has its valley. When the reference signal P is 50%, the PWM reference signal P has a central value. It is acceptable for the PWM reference signal P to have a selected value, between the maximum value and the minimum value thereof, as the central value excepting its 50%. In the exemplary embodiment, the central point of the PWM reference signal P corresponds to its central value. Further, the detection timing of each of the phase current sensors 71-73 corresponds the valley of the PWM reference signal P. Still further, yje detection timing of the bus current sensor 74 corresponds to the central point of the PWM reference signal P.

Figure 7:
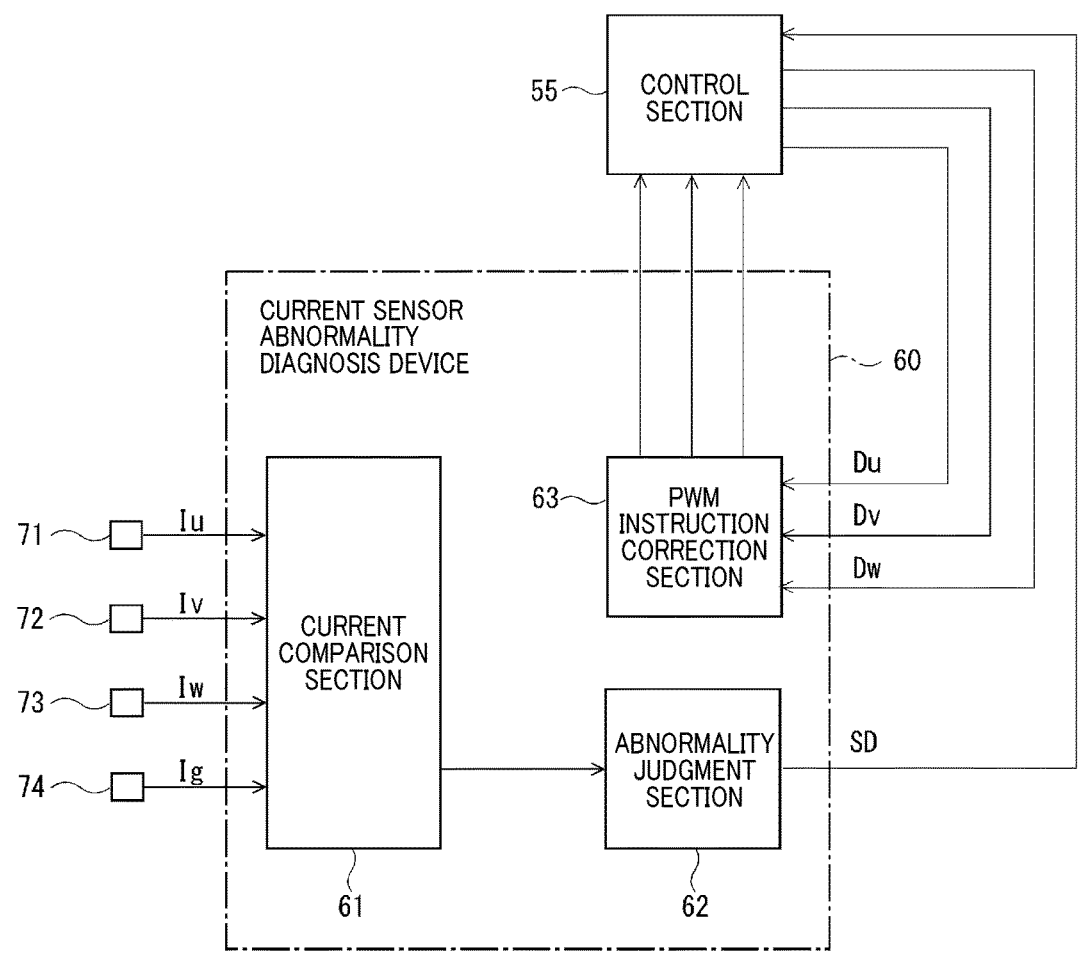
FIG. 7 is a block diagram showing a structure of the current sensor abnormality diagnosis device according to the exemplary embodiment shown in FIG. 1.

When the detection timing of the phase current sensors 71-73 and the bus current sensor 74 coincides with the turning on/off timing of the switching elements 31-36, ringing occurs. Such ringing is oscillation of a current detection value. In order to avoid this phenomenon, the current sensor abnormality diagnosis device 60 has the PWM instruction correction section 63. FIG. 7 is a block diagram showing a structure of the current sensor abnormality diagnosis device 60 having the PWM instruction correction section 63 according to the exemplary embodiment shown in FIG. 1.

FIG. 3 is a view showing the detection timing of the phase current sensors 71-73 and the detection timing of the bus current sensor 74 in the motor drive system according to the exemplary embodiment shown in FIG. 1.

As shown in FIG. 3, for example, the U phase switching elements 31 is turned on and the U phase switching element 34 is turned off at the timing when 49% of the PWM reference signal P. In this case, although the bus current sensor 74 detects a bus current Ig at the timing of 50% of the PWM reference signal P, the detected current value of the current Ig flowing in the bus current sensor 74 may be an incorrect value due to the generation of a ringing phenomenon.

In order to avoid this ringing phenomenon, the PWM instruction correction section 63 corrects each of the U phase duty value Du, the V phase duty value Dv and the W phase duty value Dw to be used at the timing when the switching elements 31-36 are turned on/off.

The PWM instruction correction section 63 (see FIG. 7) offsets each of the U phase duty value Du, the V phase duty value Dv and the W phase duty value Dw so as to prevent a mean value of the U phase duty value Du, the V phase duty value Dv and the W phase duty value Dw from varying in a predetermined period of time.

Further, the PWM instruction correction section 63 offsets each of the U phase duty value Du, the V phase duty value Dv and the W phase duty value Dw by using a predetermined duty value A1 which corresponds to the period of time in which the U phase duty value Du, the V phase duty value Dv and the W phase duty value Dw are affected from the ringing phenomenon. It is possible to determine the predetermined duty value A1 on the basis of experimental results and simulation results.

Figure 4:
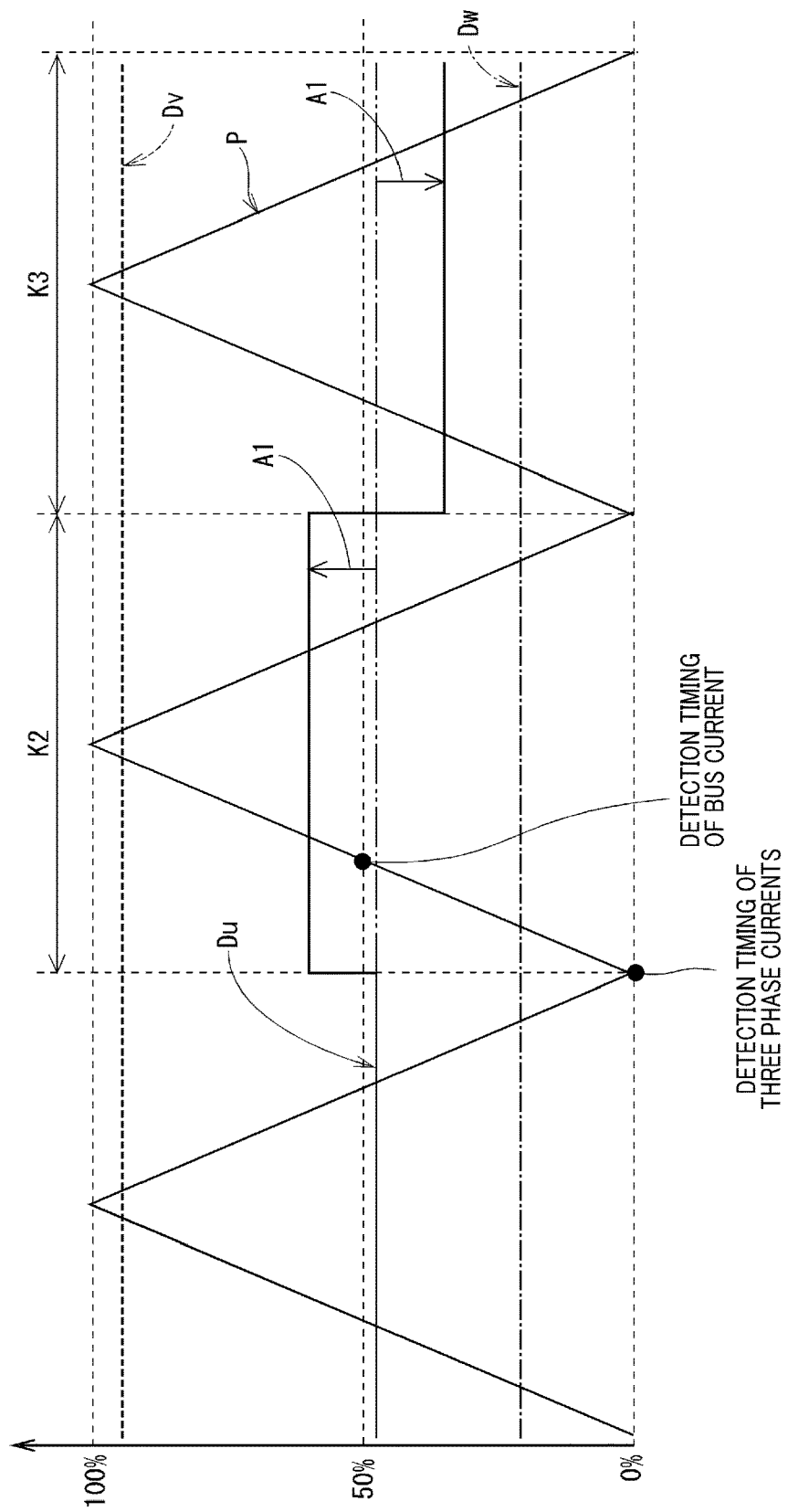
FIG. 4 is a view explaining a correction operation of a PWM instruction correction section in the current sensor abnormality diagnosis device according to the exemplary embodiment shown in FIG. 1.

FIG. 4 is a view explaining a correction operation executed by the PWM instruction correction section 63 in the current sensor abnormality diagnosis device 60 according to the exemplary embodiment shown in FIG. 1.

As shown in FIG. 4, for example, the switching element 31 and the switching element 34 in U phase are turned on and off at the timing of 49% of the PWM reference signal P. The has the PWM instruction correction section 63 offsets the U phase duty value Du by adding a predetermined value A1 during the period of time when the PWM reference signal P varies from a first valley to a following valley (second valley).

After adding the predetermined value A1 to the U phase duty value Du, the PWM instruction correction section 63 subtracts the predetermined value A1 from the U phase duty value Du during a period K3 of time in which the PWM reference signal P varies from the second valley to a following valley (third valley).

The PWM instruction correction section 63 corrects each of the U phase duty value Du, the V phase duty value Dv and the W phase duty value Dw on the basis of diagnostic results of the current sensor abnormality diagnosis device 60.

The PWM instruction correction section 63 offsets, i.e. corrects each of the U phase duty value Du, the V phase duty value Dv and the W phase duty value Dw so as to specify the current sensor in abnormality when the current sensor abnormality diagnosis device 60 detects occurrence of abnormality in one of the phase current sensors 71-73.

The has the PWM instruction correction section 63 offsets the U phase duty value Du, the V phase duty value Dv and the W phase duty value Dw so that the phase duty value of the one closet to 50% becomes more than or less than the central value of the PWM reference signal P. In other words, the PWM instruction correction section 63 offsets each of these phase duty value Du, Dv, Dw so that one having duty value closet to 50% crosses to the central value of the PWM reference signal P.

Figure 5:
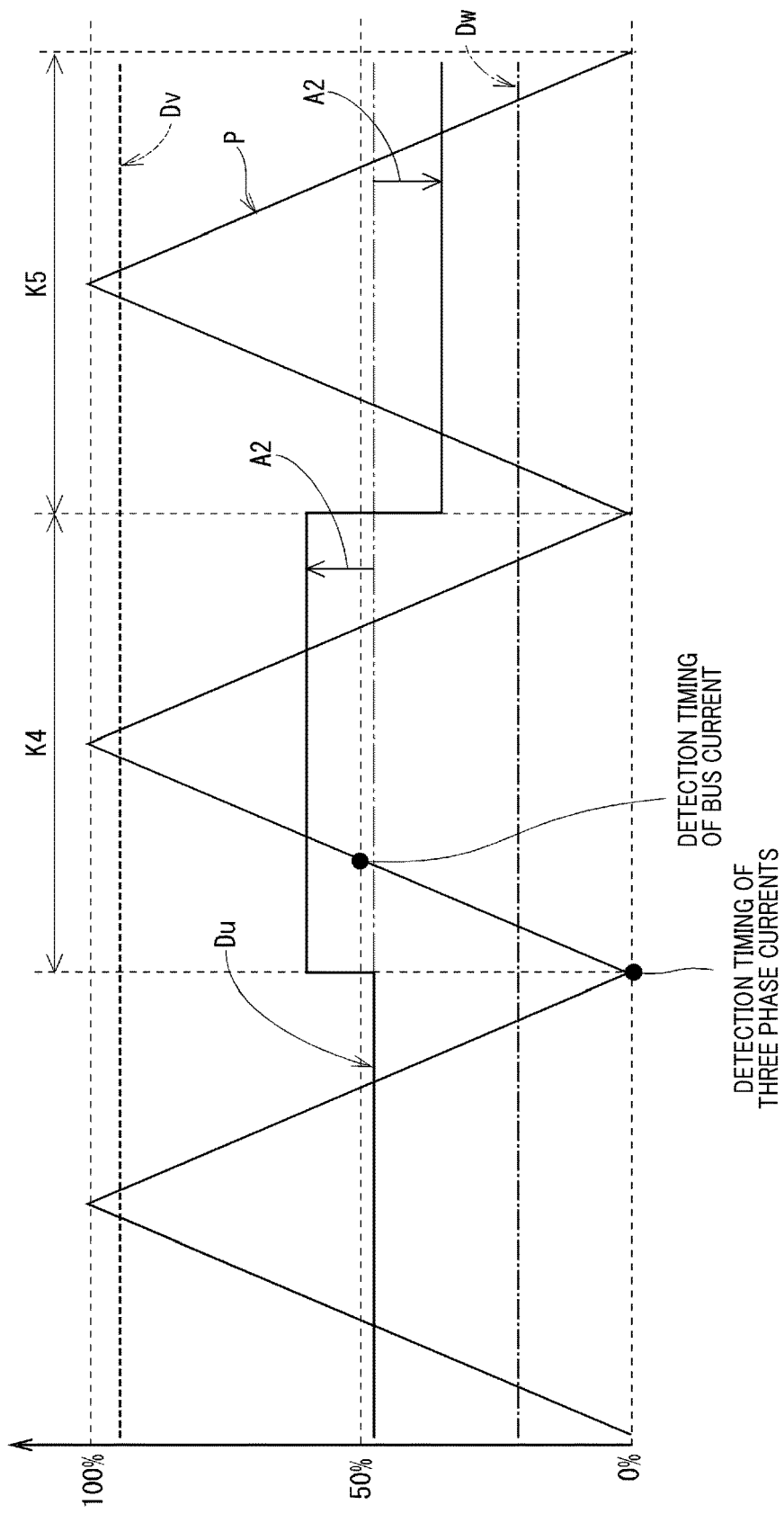
FIG. 5 is a view explaining another correction operation of the PWM instruction correction section in the current sensor abnormality diagnosis device according to the exemplary embodiment shown in FIG. 1.

FIG. 5 is a view explaining another correction operation of the PWM instruction correction section 63 in the current sensor abnormality diagnosis device 60 according to the exemplary embodiment shown in FIG. 1. For example, as shown in FIG. 5, in a case in which the U phase duty value Du is closest to 50%, and the current sensor abnormality diagnosis device 60 detects that one of the phase current sensors 71-73 is not operating normally, i.e. has failed, the PWM instruction correction section 63 offsets the U phase duty value Du by adding a predetermined value A2 to the U phase duty value Du during a period in which the PWM reference signal P varies from one valley to the following valley.

The predetermined value A2 is determined as an absolute value so that each of these phase duty value Du, Dv, Dw crosses to the central value of the PWM reference signal P.

After adding the predetermined value A2 to the U phase duty value Du, the PWM instruction correction section 63 offsets, i.e. subtracts the predetermined value A2 from the U phase duty value Du during a period K5 of time in which the PWM reference signal P varies from one valley to a next valley.

A description will be given of the correction process of the PWM instruction correction section 63 with reference to the flow chart shown in FIG. 6.

Figure 6:
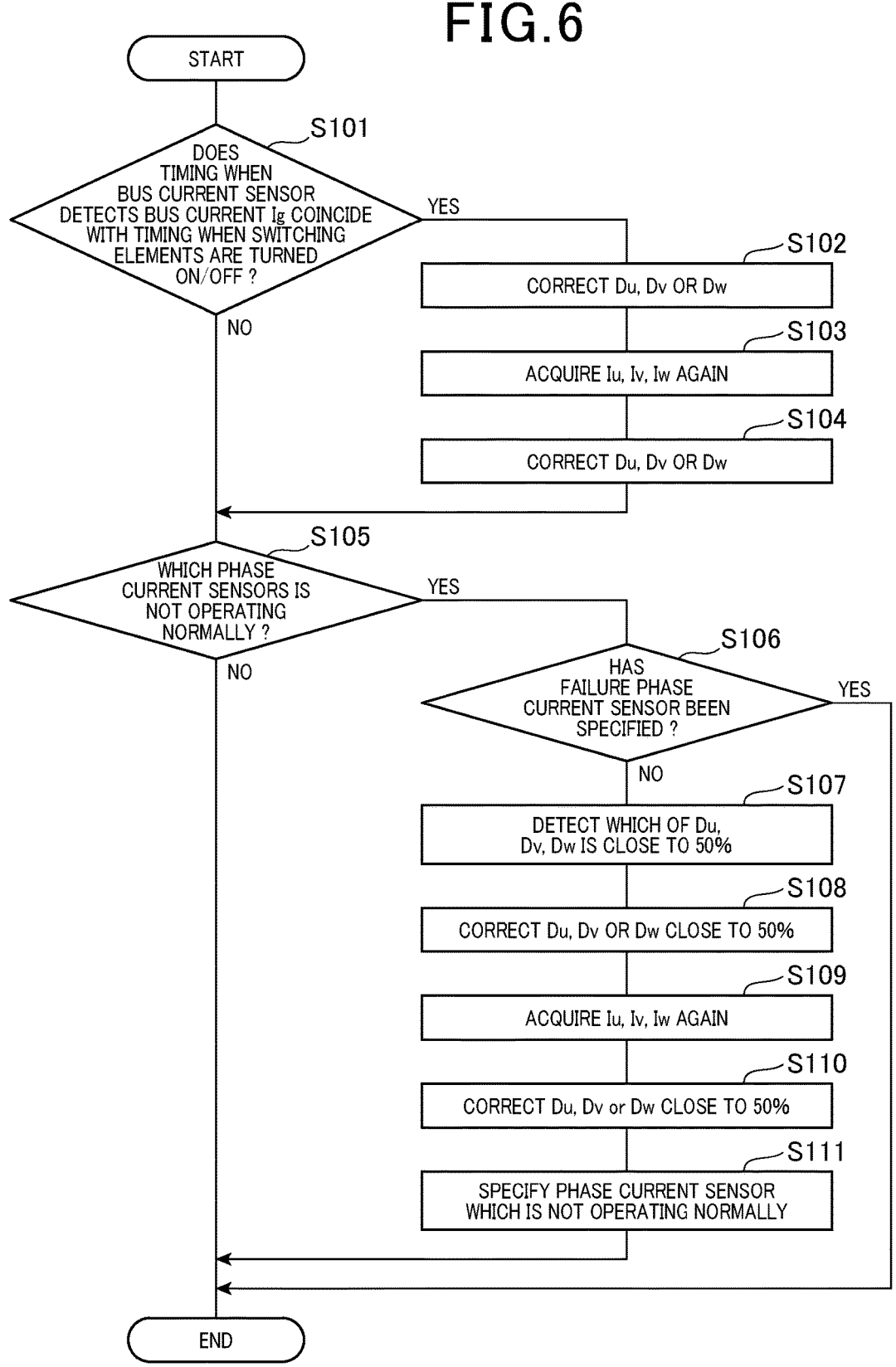
FIG. 6 is a flow chart explaining the correction operation of the PWM instruction correction section in the current sensor abnormality diagnosis device according to the exemplary embodiment shown in FIG. 1.

FIG. 6 is the flow chart explaining the correction operation of the PWM instruction correction section 63 in the current sensor abnormality diagnosis device 60 according to the exemplary embodiment shown in FIG. 1.

In step S101, the PWM instruction correction section 63 detects whether the timing when the bus current sensor 74 detects a bus current Ig coincides with the timing when the switching elements 31-36 are turned on/off.

When the detection result in step S101 indicates affirmation ("YES" in step S101), i.e. indicates that the timing when the bus current sensor 74 detects a bus current Ig coincides with the timing when the switching elements 31-36 are turned on/off, the operation flow progresses to step S102.

On the other hand, when the detection result in step S101 indicates negation ("NO" in step S101), i.e. indicates that the timing when the bus current sensor 74 detects a bus current Ig does not coincide with the timing when the switching elements 31-36 are turned on/off, the operation flow progresses to step S105.

In step S102, the PWM instruction correction section 63 corrects each of the U phase duty value Du, the V phase duty value Dv and the W phase duty value Dw. That is, the PWM instruction correction section 63 adds a predetermined value A1 to each of the U phase duty value Du, the V phase duty value Dv and the W phase duty value Dw during a predetermined period of time. When each of the U phase duty value Du, the V phase duty value Dv and the W phase duty value Dw is closest to 50%, the PWM instruction correction section 63 subtracts the predetermined value A1 from each of the U phase duty value Du, the V phase duty value Dv and the W phase duty value Dw during the predetermined period of time. The operation flow progresses to step S103.

In step S103, the current sensor abnormality diagnosis device 60 acquires again each of the U phase current Iu, the V phase current Iv, the W phase current, and the bus current Ig. The operation flow progresses to step S104.

In step S104, the PWM instruction correction section 63 corrects each of the U phase duty value Du, the V phase duty value Dv and the W phase duty value Dw on the basis of the addition result or the subtraction result obtained in step S102. The operation flow progresses to step S105.

In more detail, when the predetermined value A1 has been added to each of the U phase duty value Du, the V phase duty value Dv and the W phase duty value Dw in step S102, the PWM instruction correction section 63 subtracts the predetermined value A1 from each of the U phase duty value Du, the V phase duty value Dv and the W phase duty value Dw in step S104.

On the other hand, when the predetermined value A1 has been subtracted from each of the U phase duty value Du, the V phase duty value Dv and the W phase duty value Dw in step S102, the PWM instruction correction section 63 adds the predetermined value A1 to each of the U phase duty value Du, the V phase duty value Dv and the W phase duty value Dw in step S104. The operation flow progresses to step S105.

In step S105, the current sensor abnormality diagnosis device 60 detects whether one of the phase current sensors 71-73 is not operating normally, i.e. has failed. This detection will be explained in detail later.

When the current sensor abnormality diagnosis device 60 detects that one of the phase current sensors 71-73 is not operating normally, the operation flow progresses to step S106.

On the other hand, when the current sensor abnormality diagnosis device 60 detects that no phase current sensor is abnormal, the current sensor abnormality diagnosis device 60 finishes the execution of the process shown in FIG. 6.

In step S106, the current sensor abnormality diagnosis device 60 detects whether the abnormality of one of the phase current sensors 71-73 has been detected.

When the current sensor abnormality diagnosis device 60 detects that one of the phase current sensors 71-73 is not operating normally, i.e. has failed ("YES" in step S106), the current sensor abnormality diagnosis device 60 finishes the execution of the process shown in FIG. 6.

On the other hand, when the current sensor abnormality diagnosis device 60 has not detected that one of the phase current sensors 71-73 is not operating normally, for example, when two of the phase sensors 71-73 are not operating normally ("NO" in step S106), the operation flow progresses to step S107.

In step S107, the PWM instruction correction section 63 detects which of each of the U phase duty value Du, the V phase duty value Dv and the W phase duty value Dw is closest to 50%, the operation flow progresses to step S108.

In step S108, the PWM instruction correction section 63 corrects each of the U phase duty value Du, the V phase duty value Dv and the W phase duty value Dw which is approximately close to 50% so that each phase duty value crosses the center value of the PWM reference signal.

During the predetermined value A1, the PWM instruction correction section 63 adds the predetermined value A2 to each phase duty value which is approximately close to 50%, or subtracts the predetermined value A2 from each phase duty value which is approximately close to 50%. The operation flow progresses to step S109.

In step S109, the current sensor abnormality diagnosis device 60 acquires again the detection signal of each of the U phase current Iu, the V phase current Iv, the W phase current, and the bus current Ig. The operation flow progresses to step S110.

In step S110, the PWM instruction correction section 63 corrects each of the U phase duty value Du, the V phase duty value Dv and the W phase duty value Dw which are close to 50%. The operation flow progresses to step S111.

In step S107, when the PWM instruction correction section 63 has added the predetermined value A2 to each of the U phase duty value Du, the V phase duty value Dv and the W phase duty value Dw which are approximately close to 50%, the PWM instruction correction section 63 subtracts the predetermined value A2 from each of this U phase duty value Du, this V phase duty value Dv and this W phase duty value Dw.

Further, in step S107, when the PWM instruction correction section 63 has subtracted the predetermined value A2 from each of the U phase duty value Du, the V phase duty value Dv and the W phase duty value Dw which are approximately close to 50%, the PWM instruction correction section 63 adds the predetermined value A2 to each of this U phase duty value Du, this V phase duty value Dv and this W phase duty value Dw.

In step S111, as will be described later, the current sensor abnormality diagnosis device 60 determines and specifies that one of the phase current sensors 71-73 is abnormal on the basis of each of the corrected U phase duty value Du, the corrected V phase duty value Dv and the corrected W phase duty value Dw.

Because the EPS-ECU 50 correctly adjusts the behavior of the three phase AC motor 80, it is necessary to correctly detect the abnormality of each phase current sensor 71-73 when the phase current sensors 71-73 has a malfunction as well as to the acquirement of current information regarding the three phase currents, i.e. the U phase current Iu, the V phase current Iv and the W phase current with high accuracy.

There has been known a conventional current sensor abnormality detection device for detecting abnormality of a plurality of current sensors which detect a current of each phase winding of a multi-phase alternator current motor of not less than three phases.

The conventional current sensor abnormality detection device having the structure shown in Patent document 1 and Patent document 2 (previously described) determines an occurrence of abnormality of one of current sensors when a total sum of currents detected by the phase current sensors exceeds a threshold value.

The conventional current sensor abnormality detection device having the structure shown in Patent document 1 and Patent document 2 (previously described) detects abnormality of the current sensor on the basis of the output values of the remaining two current sensors by using Kirchhoff's laws when an output of one of the current sensors is zero. However, the conventional current sensor abnormality detection device cannot correctly specify a failed current sensor when one of the three currents sensors generates and transmits an undefined output value which is not zero.

On the other hand, the current sensor abnormality diagnosis device 60 can quickly specify the incorrect current sensor, and executes the correct control of the three phase AC motor 80.

As shown in FIG. 7, the current sensor abnormality diagnosis device 60 further has a current comparison section 61 and an abnormality judgment section 62. The current sensor abnormality diagnosis device 60 has a memory section composed of a random access memory (RAM), etc. The current sensor abnormality diagnosis device 60 stores abnormality information into the memory section. The abnormality information shows one of the phase current sensors 71-73 and the bus current sensor 74 is not operating normally, i.e. has failed.

The current comparison section 61 receives the detection signals of the three phase currents Iu, Iv and Iw, i.e. the U phase current Iu, the V phase current Iv, the W phase current and the bus current Ig, and adds the U phase current Iu, the V phase current Iv and the W phase current together, and provides a three phase current sum Is.

The current comparison section 61 compares the three phase current sum Is with a three phase current sum threshold value Is_th. In general, the three phase current sum threshold value Is_th is a value approximately close to zero. The value of zero includes a usual error range.

$$Is = Iu + Iv + Iw, \quad (1).$$

The current comparison section 61 compares the three phase currents Iu, Iv and Iw (i.e. the U phase current Iu, the V phase current Iv, the W phase current) and the bus current Ig with each other on the basis of a positive value/a negative value of each of the three phase currents Iu, Iv and Iw.

The current comparison section 61 transmits the comparison result to the abnormality judgment section 62.

The abnormality judgment section 62 determines which one of the U phase current sensor 71, the V phase current sensor 72, the W phase current sensor 73, and the bus current sensor 74 is not operating normally, i.e. has failed.

Because the detection value of each of the current sensors 71-73, 74 becomes inaccuracy due to ringing generated when the switching elements 31-36 are turned on/off, it is acceptable for the abnormality judgment section 62 to temporarily halt the operation of the phase current sensors 71-73 or the bus line current sensor 74.

When the three phase current sum Is (i.e. the total sum of the detected three phase currents Iu, Iv and Iw) is not more than the three phase current sum threshold value Is_th, the abnormality judgment section 62 determines that each of the U phase current sensor 71, the V phase current sensor 72, the W phase current sensor 73 is operating normally.

On the other hand, when the three phase current sum Is exceeds the three phase current sum threshold value Is_th, the abnormality judgment section 62 determines that one of the U phase current sensor 71, the V phase current sensor 72, the W phase current sensor 73 is not operating normally, i.e. has failed.

Further, the abnormality judgment section 62 detects whether the bus current sensor 74 has failed on the basis of a relationship between the three phase currents Iu, Iv and Iw (i.e. the U phase current Iu, the V phase current Iv, the W phase current) and the bus current Ig under the condition in which all of the U phase current sensor 71, the V phase current sensor 72, the W phase current sensor 73 are operating normally.

A description will be given of the abnormality judgment, i.e. abnormality diagnosis executed by the current sensor abnormality diagnosis device 60 with reference to FIG. 8.

Figure 8:
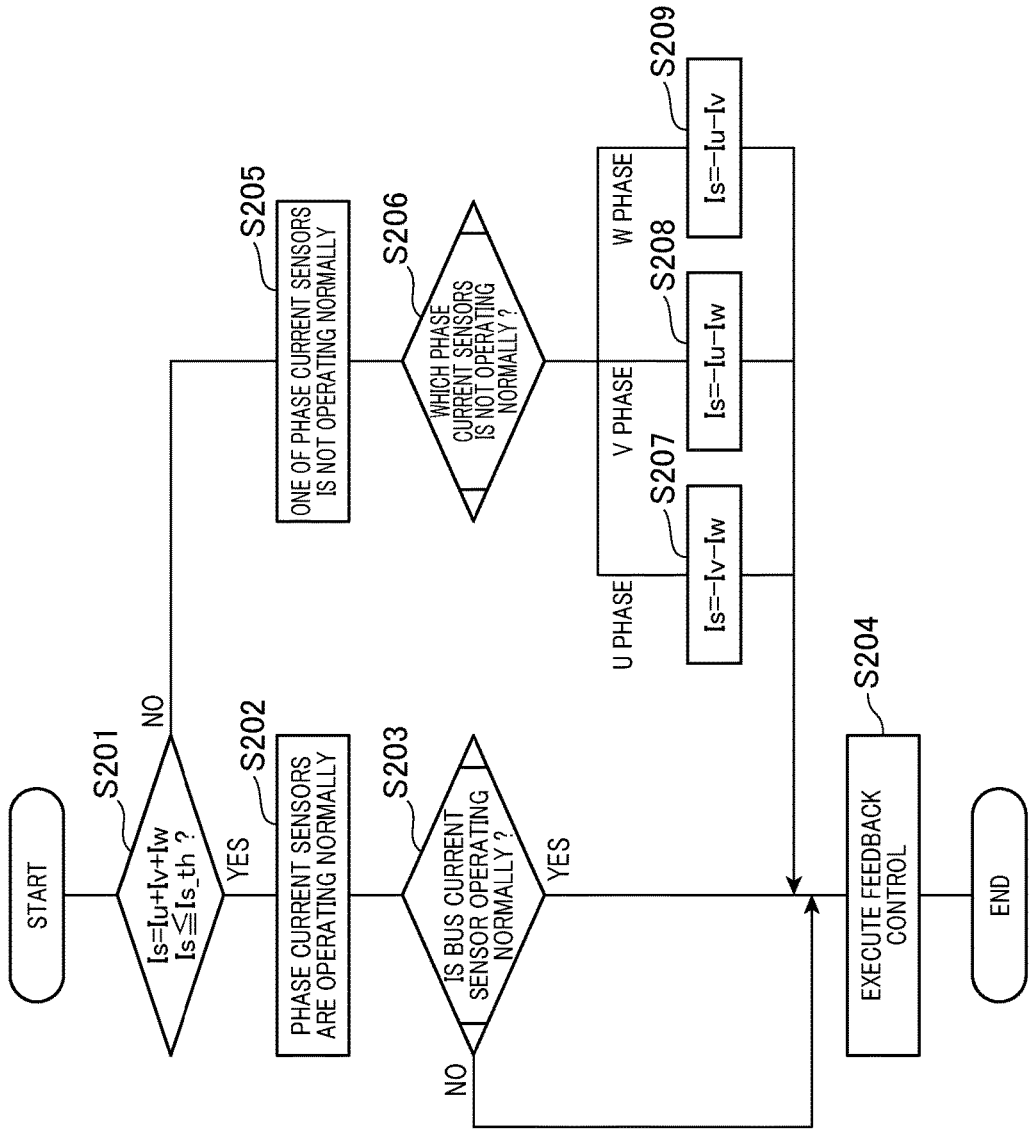
FIG. 8 is a flow chart explaining an abnormality diagnosis process executed by the current sensor abnormality diagnosis device according to the exemplary embodiment shown in FIG. 1.

FIG. 8 is a flow chart explaining the abnormality diagnosis process executed by the current sensor abnormality diagnosis device 60 according to the exemplary embodiment shown in FIG. 1.

In step S201 shown in FIG. 8, the current comparison section 61 compares the three phase current sum Is with the three phase current sum threshold value Is_th.

When the detection result in step S201 indicates affirmation ("YES" in step S201), i.e. indicates that the three phase current sum Is is not more than the three phase current sum threshold value Is_th, the operation flow progresses to step S202.

On the other hand, when the detection result in step S201 indicates negation ("NO" in step S201), i.e. indicates that the three phase current sum Is exceeds the three phase current sum threshold value Is_th, the operation flow progresses to step S207.

In step S202, the abnormality judgment section 62 judges that all of the U phase current sensor 71, the V phase current sensor 72 and the W phase current sensor 73 are operating normally. The operation flow progresses to step S203.

In step S203, the abnormality judgment section 62 determines whether the bus current sensor 74 is operating normally on the basis of the relationship between the three phase currents Iu, Iv and Iw (i.e. the U phase current Iu, the V phase current Iv, the W phase current) and the bus current Ig.

In the following equations (2) to (7), a first current value Id1 is an absolute value of a value obtained by subtracting the U phase current Iu and the V phase current Iv from the bus current Ig. A second current value Id2 is an absolute value of a value obtained by adding the W phase current Iw to the bus current Ig.

Further, a third current value Id3 is an absolute value of a value obtained by subtracting the U phase current Iu and the W phase current Iw from the bus current Ig. A fourth current value Id4 is an absolute value of a value obtained by adding the V phase current Iv to the bus current Ig.

Still further, a fifth current value Id5 is an absolute value of a value obtained by subtracting the U phase current Iu from the bus current Ig, and a sixth current value Id6 is an absolute value of a value obtained by adding the V phase current Iv and the W phase current Iw to the bus current Ig.

$$Id1 = |Ig - Iu - Iv| \quad (2),$$

$$Id2 = |Ig + Iw| \quad (3),$$

$$Id3 = |Ig - Iu - Iw| \quad (4),$$

$$Id4 = |Ig + Iv| \quad (5),$$

$$Id5 = |Ig - Iu| \quad (6), \text{ and}$$

$$Id6 = |Ig + Iv + Iw| \quad (7).$$

In the following equations (8) to (13), a seventh current value Id7 is an absolute value of a value obtained by adding the U phase current Iu and the V phase current Iv to the bus current Ig. An eighth current value Id8 is an absolute value of a value obtained by subtracting the W phase current Iw from the bus current Ig.

Further, a ninth current value Id9 is an absolute value of a value obtained by adding the U phase current Iu and the W phase current Iw to the bus current Ig. A tenth current value Id10 is an absolute value of a value obtained by subtracting the V phase current Iv from the bus current Ig.

Still further, an eleventh current value Id11 is an absolute value of a value obtained by adding the U phase current Iu to the bus current Ig, and a twelfth current value Id12 is an absolute value of a value obtained by subtracting the V phase current Iv and the W phase current Iw from the bus current Ig.

$$Id7 = |Ig + Iu + Iv| \quad (7),$$

$$Id8 = |Ig - Iw| \quad (8),$$

$$Id9 = |Ig + Iu + Iw| \quad (9),$$

$$Id10 = |Ig - Iv| \quad (11),$$

$$Id11 = |Ig + Iu| \quad (12), \text{ and}$$

$$Id12 = |Ig - Iv - Iw| \quad (13).$$

A first threshold value Id1_th is used for the first current value Id1. A second threshold value Id2_th is used for the second current value Id2. A third threshold value Id3_th is used for the third current value Id3. A fourth threshold value Id4_th is used for the fourth current value Id4. A fifth threshold value Id5_th is used for the fifth current value Id5. A sixth threshold value Id6_th is used for the sixth current value Id6.

Further, a seventh threshold value Id7_th is used for the seventh current value Id7. An eighth threshold value Id8_th is used for the eighth current value Id8. A ninth threshold value Id9_th is used for the ninth current value Id9. A tenth threshold value Id10_th is used for the tenth current value Id10. An eleventh threshold value Id11_th is used for the eleventh current value Id11. A twelfth threshold value Id12_th is used for the twelfth current value Id12.

In step S203, the abnormality judgment section 62 detects whether the bus current sensor 74 is operating normally.

When the abnormality judgment section 62 determines that the bus current sensor 74 is operating normally, the operation flow progresses to step S204.

On the other hand, when the abnormality judgment section 62 determines that the bus current sensor 74 is not operating normally, i.e. has failed, the operation flow progresses to step S205.

A description will be given of the explanation of the abnormality judgment of the abnormality judgment section 62 with reference to FIG. 9 and FIG. 10. That is, the abnormality judgment section 62 detects whether the bus current sensor 74 is operating normally in step S203 by using the first to twelfth current values Id1 to Id12, and the first threshold value Id1_th to the twelfth threshold value Id12_th.

Figure 9:
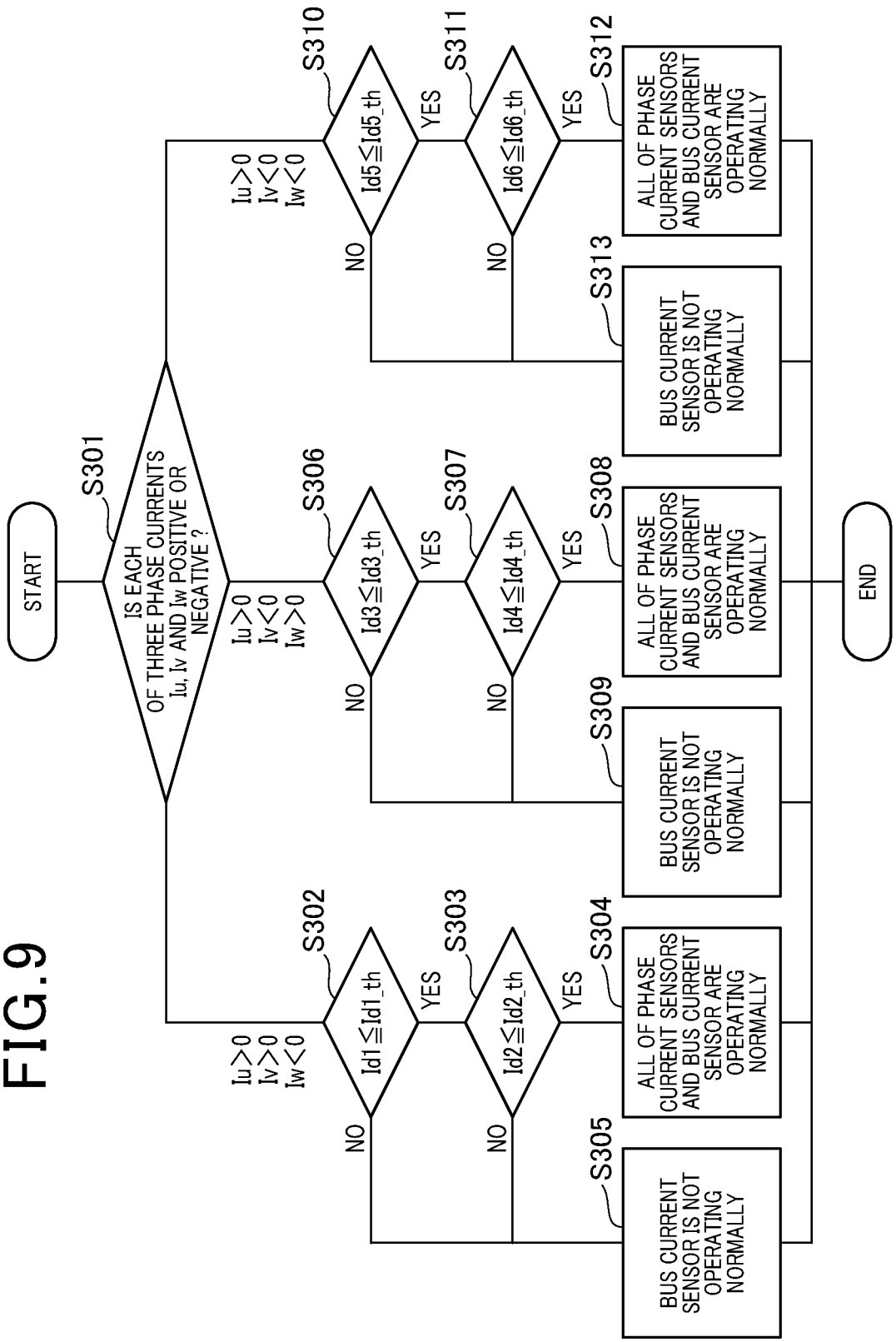
FIG. 9 is a sub-flow chart explaining the abnormality diagnosis process executed by the current sensor abnormality diagnosis device according to the exemplary embodiment shown in FIG. 1.

FIG. 9 is a sub-flow chart explaining the abnormality diagnosis process executed by the abnormality judgment section 62 in the current sensor abnormality diagnosis device 60 according to the exemplary embodiment shown in FIG. 1. FIG. 10 is another sub-flow chart explaining the abnormality diagnosis process executed by the abnormality judgment section 62 in the current sensor abnormality diagnosis device 60 according to the exemplary embodiment shown in FIG. 1.

Figure 10:
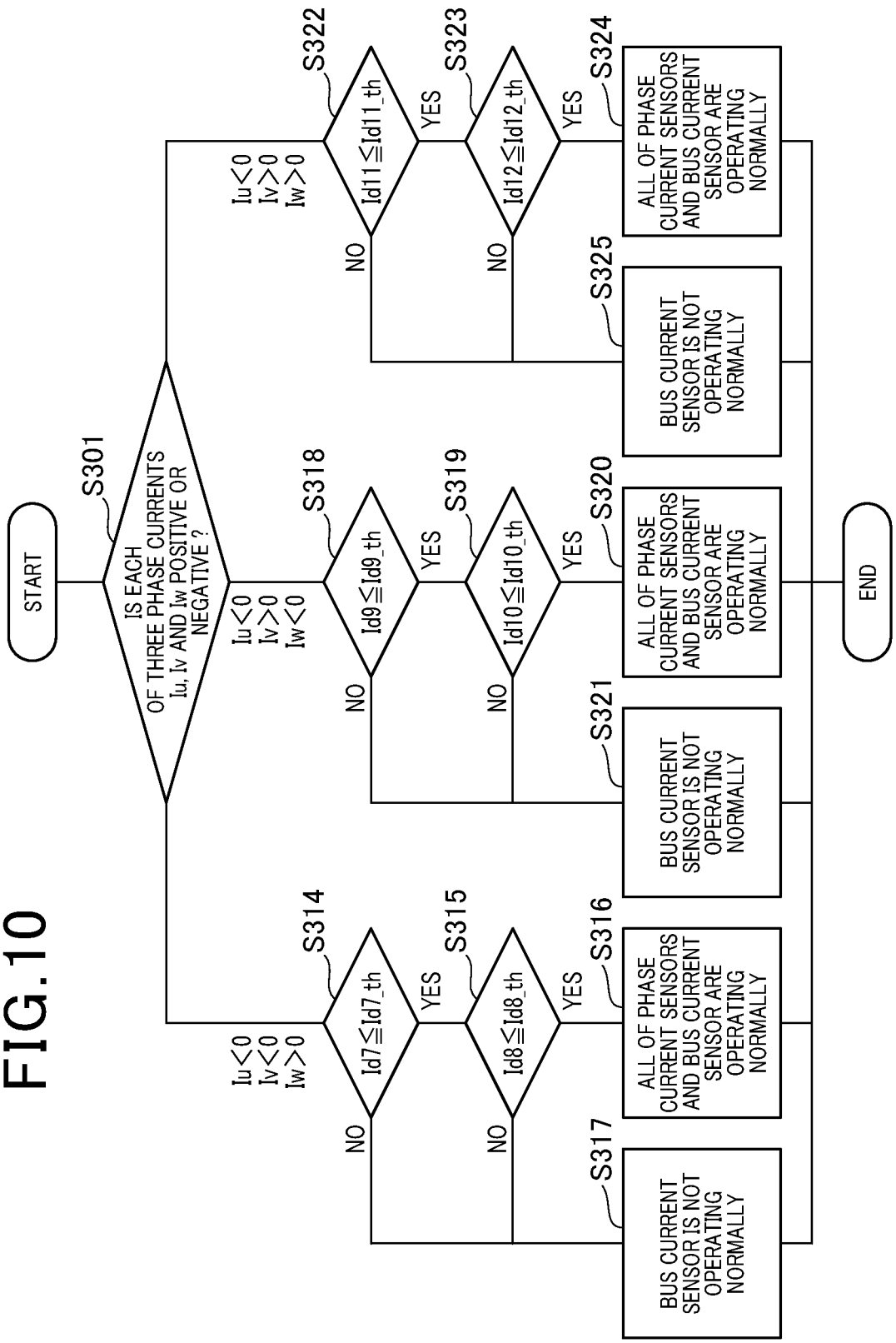
FIG. 10 is another sub-flow chart explaining the abnormality diagnosis process executed by the current sensor abnormality diagnosis device according to the exemplary embodiment shown in FIG. 1.

In step S301 shown in FIG. 9 and FIG. 10, the current comparison section 61 detects whether each of the three phase currents Iu, Iv and Iw, i.e. the U phase current Iu, the V phase current Iv, the W phase current is a positive value or a negative value.

When the current comparison section 61 detects that the U phase current Iu is a positive value, the V phase current Iv is a positive value, and the W phase current is a negative value, the operation flow progresses to step S302 shown in FIG. 9.

On the other hand, when the current comparison section 61 detects that the U phase current Iu is a positive value, the V phase current Iv is a negative value, and the W phase current is a positive value, the operation flow progresses to step S306 shown in FIG. 9.

Further, when the current comparison section 61 detects that the U phase current Iu is a positive value, the V phase current Iv is a negative value, and the W phase current is a negative value, the operation flow progresses to step S310 shown in FIG. 9.

Further, when the current comparison section 61 detects that the U phase current Iu is a negative value, the V phase current Iv is a negative value, and the W phase current is a positive value, the operation flow progresses to step S314 shown in FIG. 10.

Still further, when the current comparison section 61 detects that the U phase current Iu is a negative value, the V phase current Iv is a positive value, and the W phase current is a negative value, the operation flow progresses to step S318 shown in FIG. 10.

Still further, when the current comparison section 61 detects that the U phase current Iu is a negative value, the V phase current Iv is a positive value, and the W phase current is a positive value, the operation flow progresses to step S322 shown in FIG. 10.

In step S302 shown in FIG. 9, the current comparison section 61 detects whether the first current value Id1 is not more than the first threshold value Id1_th.

When the detection result in step S302 indicates affirmation ("YES" in step S302), i.e. indicates that the first current value Id1 is not more than the first threshold value Id1_th, the operation flow progresses to step S303.

On the other hand, when the detection result in step S302 indicates negation ("NO" in step S302), i.e. indicates that the first current value Id1 is more than the first threshold value Id1_th, the operation flow progresses to step S305.

In step S303 shown in FIG. 9, the current comparison section 61 detects whether the second current value Id2 is not more than the second threshold value Id2_th.

When the detection result in step S303 indicates affirmation ("YES" in step S303), i.e. indicates that the second current value Id2 is not more than the second threshold value Id2_th, the operation flow progresses to step S304.

On the other hand, when the detection result in step S303 indicates negation ("NO" in step S303), i.e. indicates that the second current value Id2 is more than the second threshold value Id2_th, the operation flow progresses to step S305.

In step S304 shown in FIG. 9, the abnormality judgment section 62 judges that all of the phase current sensors 71-73 and the bus current sensor 74 are operating normally, i.e. have not failed. The operation flow progresses to step S204.

In step S305, the abnormality judgment section 62 judges that the bus current sensor 74 is not operating normally, i.e. has failed. The operation flow progresses to step S204.

In step S306 shown in FIG. 9, the current comparison section 61 detects whether the third current value Id3 is not more than the third threshold value Id3_th.

When the detection result in step S306 indicates affirmation ("YES" in step S306), i.e. indicates that the third current value Id3 is not more than the third threshold value Id3_th, the operation flow progresses to step S307.

On the other hand, when the detection result in step S306 indicates negation ("NO" in step S306), i.e. indicates that the third current value Id3 is more than the third threshold value Id3_th, the operation flow progresses to step S309.

In step S307 shown in FIG. 9, the current comparison section 61 detects whether the fourth current value Id4 is not more than the fourth threshold value Id4_th.

When the detection result in step S307 indicates affirmation ("YES" in step S307), i.e. indicates that the fourth current value Id4 is not more than the fourth threshold value Id4_th, the operation flow progresses to step S308.

On the other hand, when the detection result in step S307 indicates negation ("NO" in step S307), i.e. indicates that the fourth current value Id4 is more than the fourth threshold value Id4_th, the operation flow progresses to step S309.

In step S308 shown in FIG. 9, the abnormality judgment section 62 judges that all of the phase current sensors 71-73 and the bus current sensor 74 are operating normally, i.e. have not failed. The operation flow progresses to step S204.

In step S309, the abnormality judgment section 62 judges that the bus current sensor 74 is not operating normally, i.e. has failed. The operation flow progresses to step S204.

In step S310 shown in FIG. 9, the current comparison section 61 detects whether the fifth current value Id5 is not more than the fifth threshold value Id5_th.

When the detection result in step S310 indicates affirmation ("YES" in step S310), i.e. indicates that the fifth current value Id5 is not more than the fifth threshold value Id5_th, the operation flow progresses to step S311.

On the other hand, when the detection result in step S310 indicates negation ("NO" in step S310), i.e. indicates that the fifth current value Id5 is more than the fifth threshold value Id5_th, the operation flow progresses to step S313.

In step S311 shown in FIG. 9, the current comparison section 61 detects whether the sixth current value Id6 is not more than the sixth threshold value Id6_th.

When the detection result in step S311 indicates affirmation ("YES" in step S311), i.e. indicates that the sixth current value Id6 is not more than the sixth threshold value Id6_th, the operation flow progresses to step S312.

On the other hand, when the detection result in step S311 indicates negation ("NO" in step S311), i.e. indicates that the sixth current value Id6 is more than the sixth threshold value Id6_th, the operation flow progresses to step S313.

In step S312 shown in FIG. 9, the abnormality judgment section 62 judges that all of the phase current sensors 71-73 and the bus current sensor 74 are operating normally, i.e. have not failed. The operation flow progresses to step S204.

In step S313, the abnormality judgment section 62 judges that the bus current sensor 74 is not operating normally, i.e. has failed. The operation flow progresses to step S204.

In step S314 shown in FIG. 10, the current comparison section 61 detects whether the seventh current value Id7 is not more than the seventh threshold value Id7_th.

When the detection result in step S314 indicates affirmation ("YES" in step S314), i.e. indicates that the seventh current value Id7 is not more than the seventh threshold value Id7_th, the operation flow progresses to step S315.

On the other hand, when the detection result in step S314 indicates negation ("NO" in step S314), i.e. indicates that the seventh current value Id7 is more than the seventh threshold value Id7_th, the operation flow progresses to step S317.

In step S315 shown in FIG. 10, the current comparison section 61 detects whether the eighth current value Id8 is not more than the eighth threshold value Id8_th.

When the detection result in step S315 indicates affirmation ("YES" in step S315), i.e. indicates that the eighth current value Id8 is not more than the eighth threshold value Id8_th, the operation flow progresses to step S316.

On the other hand, when the detection result in step S315 indicates negation ("NO" in step S315), i.e. indicates that the eighth current value Id8 is more than the eighth threshold value Id8_th, the operation flow progresses to step S317.

In step S316 shown in FIG. 10, the abnormality judgment section 62 judges that all of the phase current sensors 71-73 and the bus current sensor 74 are operating normally, i.e. have not failed. The operation flow progresses to step S204.

In step S317, the abnormality judgment section 62 judges that the bus current sensor 74 is not operating normally, i.e. has failed. The operation flow progresses to step S204.

In step S318 shown in FIG. 10, the current comparison section 61 detects whether the ninth current value Id9 is not more than the ninth threshold value Id9_th.

When the detection result in step S318 indicates affirmation ("YES" in step S318), i.e. indicates that the ninth current value Id9 is not more than the ninth threshold value Id9_th, the operation flow progresses to step S319.

On the other hand, when the detection result in step S318 indicates negation ("NO" in step S319), i.e. indicates that the ninth current value Id9 is more than the ninth threshold value Id9_th, the operation flow progresses to step S321.

In step S319 shown in FIG. 10, the current comparison section 61 detects whether the tenth current value Id10 is not more than the tenth threshold value Id10_th.

When the detection result in step S319 indicates affirmation ("YES" in step S319), i.e. indicates that the tenth current value Id10 is not more than the tenth threshold value Id10_th, the operation flow progresses to step S320.

On the other hand, when the detection result in step S319 indicates negation ("NO" in step S319), i.e. indicates that the tenth current value Id10 is more than the tenth threshold value Id10_th, the operation flow progresses to step S321.

In step S320 shown in FIG. 10, the abnormality judgment section 62 judges that all of the phase current sensors 71-73 and the bus current sensor 74 are operating normally, i.e. has not failed. The operation flow progresses to step S204.

In step S321, the abnormality judgment section 62 judges that the bus current sensor 74 is not operating normally, i.e. has failed. The operation flow progresses to step S204.

In step S322 shown in FIG. 10, the current comparison section 61 detects whether the eleventh current value Id11 is not more than the eleventh threshold value Id11_th.

When the detection result in step S322 indicates affirmation ("YES" in step S322), i.e. indicates that the eleventh current value Id11 is not more than the eleventh threshold value Id11_th, the operation flow progresses to step S323.

On the other hand, when the detection result in step S322 indicates negation ("NO" in step S322), i.e. indicates that the eleventh current value Id11 is more than the eleventh threshold value Id11_th, the operation flow progresses to step S324.

In step S323 shown in FIG. 10, the current comparison section 61 detects whether the twelfth current value Id12 is not more than the twelfth threshold value Id12_th.

When the detection result in step S323 indicates affirmation ("YES" in step S323), i.e. indicates that the twelfth current value Id12 is not more than the twelfth threshold value Id12_th, the operation flow progresses to step S324.

On the other hand, when the detection result in step S323 indicates negation ("NO" in step S323), i.e. indicates that the twelfth current value Id12 is more than the twelfth threshold value Id12_th, the operation flow progresses to step S325.

In step S324 shown in FIG. 10, the abnormality judgment section 62 judges that all of the phase current sensors 71-73 and the bus current sensor 74 are operating normally, i.e. have not failed. The operation flow progresses to step S204.

In step S309, the abnormality judgment section 62 judges that the bus current sensor 74 is not operating normally, i.e. has failed. The operation flow progresses to step S204.

In step S204 shown in FIG. 8, the control section 55 executes feedback control on the basis of the three phase currents Iu, Iv and Iw, i.e. the U phase current Iu, the V phase current Iv, the W phase current. The current sensor abnormality diagnosis device 60 finishes the execution of the abnormality diagnosis process shown in FIG. 8.

In step S205, the abnormality judgment section 62 judges that one of the phase current sensors 71-73 is not operating normally, i.e. has failed. The operation flow progresses to step S206.

In step S206, the abnormality judgment section 62 detects which of the phase current sensors 71-73 has failed.

When the abnormality judgment section 62 determines that the U phase current sensor 71 has failed, the operation flow progresses to step S207.

On the other hand, when the abnormality judgment section 62 determines that the V phase current sensor 72 has failed, the operation flow progresses to step S208.

Further, when the abnormality judgment section 62 determines that the W phase current sensor 73 has failed, the operation flow progresses to step S209.

A description will be given of the explanation of the abnormality judgment of the abnormality judgment section 62 with reference to FIG. 11 and FIG. 12. That is, the abnormality judgment section 62 detects whether each of the phase current sensors 71-73 is operating normally in step S206 by using the first to twelfth current values Id1 to Id12, and the first threshold value Id1_th to the twelfth threshold value Id12_th.

Figure 11:
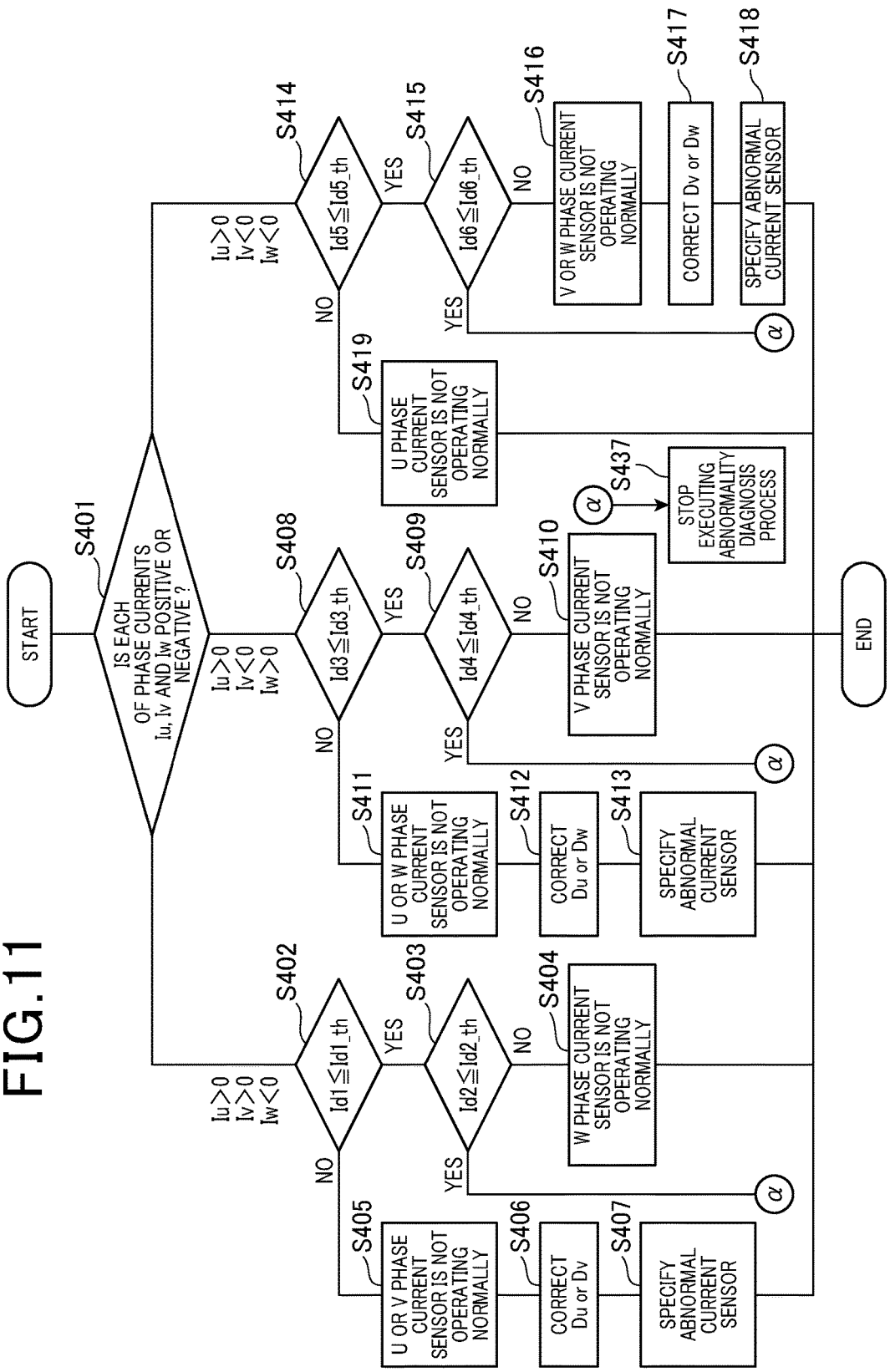
FIG. 11 is another sub-flow chart explaining the abnormality diagnosis process executed by the current sensor abnormality diagnosis device according to the exemplary embodiment shown in FIG. 1.

FIG. 11 is another sub-flow chart showing the abnormality diagnosis process executed by the abnormality judgment section 62 in the current sensor abnormality diagnosis device 60 according to the exemplary embodiment shown in FIG. 1. FIG. 12 is another sub-flow chart showing the abnormality diagnosis process executed by the abnormality judgment section 62 in the current sensor abnormality diagnosis device 60 according to the exemplary embodiment shown in FIG. 1.

Figure 12:
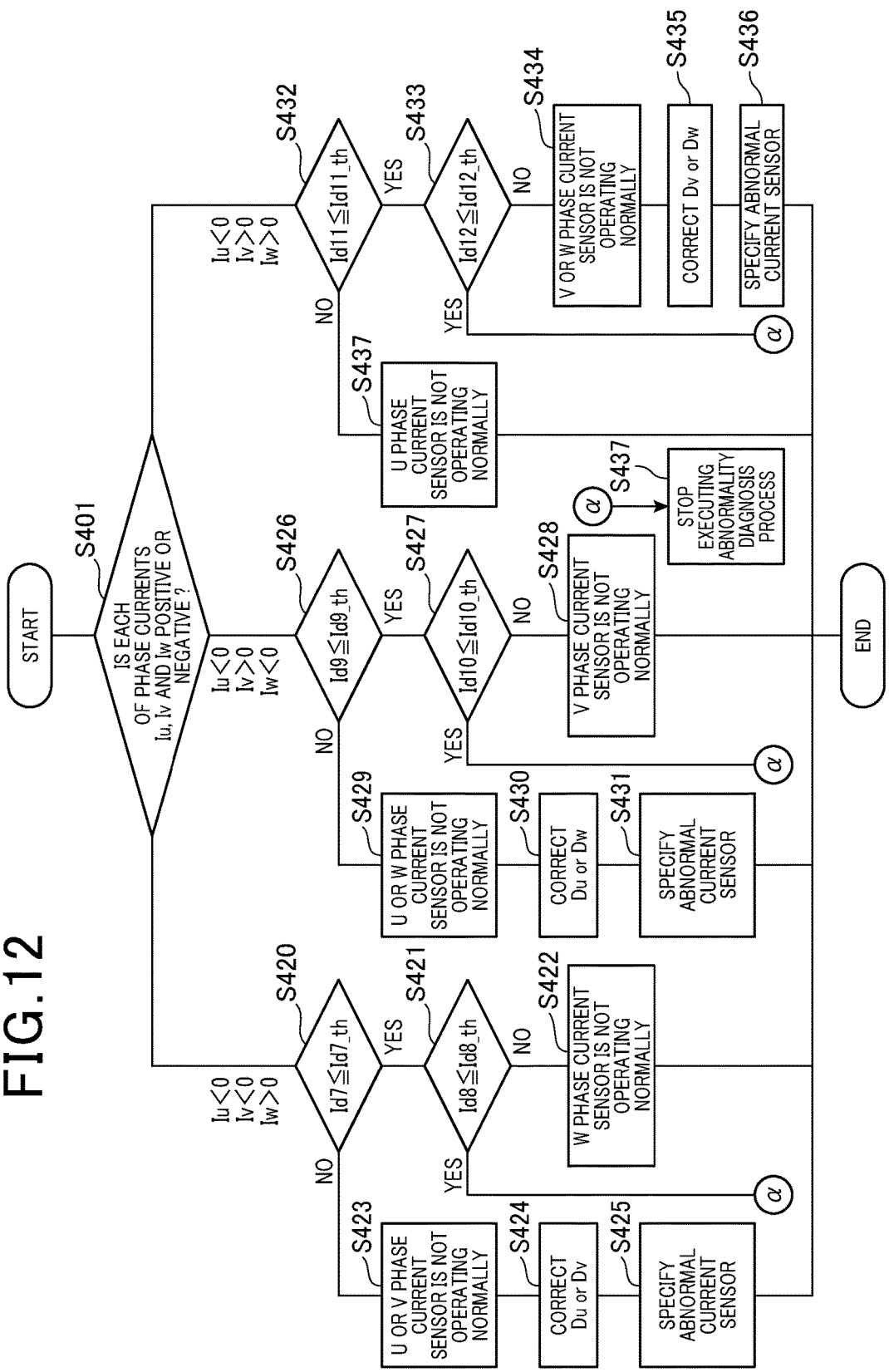
FIG. 12 is another sub-flow chart explaining the abnormality diagnosis process executed by the current sensor abnormality diagnosis device according to the exemplary embodiment shown in FIG. 1.

In step S401 shown in FIG. 11 and FIG. 12, the current comparison section 61 detects whether each of the three phase currents Iu, Iv and Iw, i.e. the U phase current Iu, the V phase current Iv, the W phase current is a positive value or a negative value.

When the current comparison section 61 detects that the U phase current Iu is a positive value, the V phase current Iv is a positive value, and the W phase current is a negative value, the operation flow progresses to step S402.

On the other hand, when the current comparison section 61 detects that the U phase current Iu is a positive value, the V phase current Iv is a negative value, and the W phase current is a positive value, the operation flow progresses to step S408.

Further, when the current comparison section 61 detects that the U phase current Iu is a positive value, the V phase current Iv is a negative value, and the W phase current is a negative value, the operation flow progresses to step S414.

Further, when the current comparison section 61 detects that the U phase current Iu is a negative value, the V phase current Iv is a negative value, and the W phase current is a positive value, the operation flow progresses to step S420.

Still further, when the current comparison section 61 detects that the U phase current Iu is a negative value, the V phase current Iv is a positive value, and the W phase current is a negative value, the operation flow progresses to step S426.

Still further, when the current comparison section 61 detects that the U phase current Iu is a negative value, the V phase current Iv is a positive value, and the W phase current is a positive value, the operation flow progresses to step S432.

In step S402, the current comparison section 61 detects whether the first current value Id1 is not more than the first threshold value Id1_th.

When the detection result in step S402 indicates affirmation ("YES" in step S402), i.e. indicates that the first current value Id1 is not more than the first threshold value Id1_th, the operation flow progresses to step S403.

On the other hand, when the detection result in step S402 indicates negation ("NO" in step S402), i.e. indicates that the first current value Id1 is more than the first threshold value Id1_th, the operation flow progresses to step S405.

In step S403, the current comparison section 61 detects whether the second current value Id2 is not more than the second threshold value Id2_th.

When the detection result in step S403 indicates affirmation ("YES" in step S403), i.e. indicates that the second current value Id2 is not more than the second threshold value Id2_th, the operation flow progresses to step S437.

On the other hand, when the detection result in step S403 indicates negation ("NO" in step S403), i.e. indicates that the second current value Id2 is more than the second threshold value Id2_th, the operation flow progresses to step S404.

In step S404, the abnormality judgment section 62 judges that the W phase current sensor is not operating normally, i.e. has failed, the operation flow progresses to step S209.

In step S405, the abnormality judgment section 62 judges that the W phase current sensor is operating normally, i.e. has not failed, and the U phase current sensor 71 or the V phase current sensor 72 is not operating normally, i.e. has failed. The operation flow progresses to step S406.

In step S406, the PWM instruction correction section 63 selects one of the U phase duty value Du and the V phase duty value Dv which is closest to 50%.

Further, the PWM instruction correction section 63 corrects one of the U phase duty value Du and the V phase duty value Dv which is closest to 50% so that one having duty value closet to 50% crosses to the central value of the PWM reference signal P.

In step S407, the current comparison section 61 acquires again the bus current Ig, and the three phase currents Iu, Iv and Iw, i.e. the U phase current Iu, the V phase current Iv, the W phase current, and executes the comparison process previously described.

The abnormality judgment section 62 detects and specifies which of the U phase current sensor 71 and the V phase current sensor 72 has failed on the basis of the comparison results executed by the current comparison section 61.

For example, in step S401, when the U phase current Iu is a positive value, the V phase current Iv is a positive value, and the W phase current is a negative value, and the U phase duty value Du is approximately closest to 50%, the U phase current Iu becomes a negative value, the V phase current Iv becomes a positive value, and the W phase current becomes a positive value after the PWM instruction correction section 63 has corrected the U phase duty value Du. At this time, an absolute value of the bus current Ig becomes equal to an absolute value of the V phase current Iv (i.e. |Ig|=|Iv|).

The abnormality judgment section 62 can detect whether the V phase current sensor 72 is operating normally or is not operating normally (i.e. has failed). It is accordingly possible for the abnormality judgment section 62 to determine which of the U phase current sensor 71 and the V phase current sensor 72 is not operating normally, i.e. has failed.

When the abnormality judgment section 62 determines that the U phase current sensor 71 has failed, the operation flow progresses to step S207.

On the other hand, when the abnormality judgment section 62 determines that the V phase current sensor 72 has failed, the operation flow progresses to step S208.

In step S408, the current comparison section 61 detects whether the third current value Id3 is not more than the third threshold value Id3_th.

When the detection result in step S408 indicates affirmation ("YES" in step S408), i.e. indicates that the third current value Id3 is not more than the third threshold value Id3_th, the operation flow progresses to step S409.

On the other hand, when the detection result in step S306 indicates negation ("NO" in step S408), i.e. indicates that the third current value Id3 is more than the third threshold value Id3_th, the operation flow progresses to step S411.

In step S409, the current comparison section 61 detects whether the fourth current value Id4 is not more than the fourth threshold value Id4_th.

When the detection result in step S409 indicates affirmation ("YES" in step S409), i.e. indicates that the fourth current value Id4 is not more than the fourth threshold value Id4_th, the operation flow progresses to step S437. On the other hand, when the detection result in step S409 indicates negation ("NO" in step S409), i.e. indicates that the fourth current value Id4 is more than the fourth threshold value Id4_th, the operation flow progresses to step S410.

In step S410, the abnormality judgment section 62 judges that the V phase current sensor 72 is not operating normally, i.e. has failed. The operation flow progresses to step S208.

In step S411, the abnormality judgment section 62 judges that the V phase current sensor 72 is operating normally, i.e. has not failed, and the U phase current sensor 71 or the W phase current sensor 73 is not operating normally, i.e. has failed. The operation flow progresses to step S412.

In step S412, the PWM instruction correction section 63 selects one of the U phase duty value Du and the W phase duty value Dw which is closest to 50%. Further, the PWM instruction correction section 63 corrects one of the U phase duty value Du and the W phase duty value Dw which is closest to 50% so that one having duty value closet to 50% crosses to the central value of the PWM reference signal P.

In step S413, the current comparison section 61 acquires again the bus current Ig, and the three phase currents Iu, Iv and Iw, i.e. the U phase current Iu, the V phase current Iv, the W phase current, and executes the comparison process previously described.

Similar to the process in step S407, the abnormality judgment section 62 detects and specifies which of the U phase current sensor 71 and the W phase current sensor 73 has failed on the basis of the comparison results executed by the current comparison section 61.

When the abnormality judgment section 62 determines that the U phase current sensor 71 has failed, the operation flow progresses to step S207.

On the other hand, when the abnormality judgment section 62 determines that the W phase current sensor 73 has failed, the operation flow progresses to step S209.

In step S414, the current comparison section 61 detects whether the fifth current value Id5 is not more than the fifth threshold value Id5_th.

When the detection result in step S414 indicates affirmation ("YES" in step S414), i.e. indicates that the fifth current value Id5 is not more than the fifth threshold value Id5_th, the operation flow progresses to step S4151.

On the other hand, when the detection result in step S414 indicates negation ("NO" in step S414), i.e. indicates that the fifth current value Id5 is more than the fifth threshold value Id5_th, the operation flow progresses to step S419.

In step S415, the current comparison section 61 detects whether the sixth current value Id6 is not more than the sixth threshold value Id6_th.

When the detection result in step S415 indicates affirmation ("YES" in step S415), i.e. indicates that the sixth current value Id6 is not more than the sixth threshold value Id6_th, the operation flow progresses to step S437.

On the other hand, when the detection result in step S415 indicates negation ("NO" in step S415), i.e. indicates that the sixth current value Id6 is more than the sixth threshold value Id6_th, the operation flow progresses to step S416.

In step S416, the abnormality judgment section 62 judges that the V phase current sensor 72 is operating normally, i.e. has not failed. Further, in step S416, the abnormality judgment section 62 judges that the V phase current sensor 72 or the W phase current sensor 73 is not operating normally, i.e. has failed. The operation flow progresses to step S412.

In step S417, the PWM instruction correction section 63 selects one of the V phase duty value Dv and the W phase duty value Dw which is closest to 50%.

Further, the PWM instruction correction section 63 corrects one of the V phase duty value Dv and the W phase duty value Dw which is closest to 50% so that one having duty value closet to 50% crosses to the central value of the PWM reference signal P.

In step S418, the current comparison section 61 acquires again the bus current Ig, and the three phase currents Iu, Iv and Iw, i.e. the U phase current Iu, the V phase current Iv, the W phase current, and executes the comparison process previously described.

Similar to the process in step S407, the abnormality judgment section 62 detects and specifies which of the V phase current sensor 72 and the W phase current sensor 73 has failed on the basis of the comparison results executed by the current comparison section 61.

When the abnormality judgment section 62 determines that the V phase current sensor 72 has failed, the operation flow progresses to step S208.

On the other hand, when the abnormality judgment section 62 determines that the W phase current sensor 73 has failed, the operation flow progresses to step S209.

In step S419, the abnormality judgment section 62 judges that the U phase current sensor 71 is not operating normally, i.e. has failed. The operation flow progresses to step S209.

In step S420, the current comparison section 61 detects whether the seventh current value Id7 is not more than the seventh threshold value Id7_th.

When the detection result in step S420 indicates affirmation ("YES" in step S420), i.e. indicates that the seventh current value Id7 is not more than the seventh threshold value Id7_th, the operation flow progresses to step S421.

On the other hand, when the detection result in step S420 indicates negation ("NO" in step S420), i.e. indicates that the seventh current value Id7 is more than the seventh threshold value Id7_th, the operation flow progresses to step S423.

In step S421, the current comparison section 61 detects whether the eighth current value Id8 is not more than the eighth threshold value Id8_th.

When the detection result in step S421 indicates affirmation ("YES" in step S421), i.e. indicates that the eighth current value Id8 is not more than the eighth threshold value Id8_th, the operation flow progresses to step S437.

On the other hand, when the detection result in step S421 indicates negation ("NO" in step S421), i.e. indicates that the eighth current value Id8 is more than the eighth threshold value Id8_th, the operation flow progresses to step S422.

In step S422, the abnormality judgment section 62 judges that the W phase current sensor 73 is not operating normally, i.e. has failed. The operation flow progresses to step S209.

In step S423, the abnormality judgment section 62 judges that the W phase current sensor 73 is operating normally, i.e. has not failed, and the U phase current sensor 71 or the V phase current sensor 72 is not operating normally, i.e. has failed. The operation flow progresses to step S406.

In step S424, the PWM instruction correction section 63 selects one of the U phase duty value Du and the V phase duty value Dv which is closest to 50%.

Further, the PWM instruction correction section 63 corrects one of the U phase duty value Du and the V phase duty value Dv which is closest to 50% so that one having duty value closet to 50% crosses to the central value of the PWM reference signal P.

In step S425, the current comparison section 61 acquires again the bus current Ig, and the three phase currents Iu, Iv and Iw, i.e. the U phase current Iu, the V phase current Iv, the W phase current, and executes the comparison process previously described.

The abnormality judgment section 62 detects and specifies which of the U phase current sensor 71 and the V phase current sensor 72 has failed on the basis of the comparison results executed by the current comparison section 61.

When the abnormality judgment section 62 determines that the U phase current sensor 71 has failed, the operation flow progresses to step S207.

On the other hand, when the abnormality judgment section 62 determines that the V phase current sensor 72 has failed, the operation flow progresses to step S208.

In step S426, the current comparison section 61 detects whether the ninth current value Id9 is not more than the ninth threshold value Id9_th.

When the detection result in step S426 indicates affirmation ("YES" in step S426), i.e. indicates that the ninth current value Id9 is not more than the ninth threshold value Id9_th, the operation flow progresses to step S427.

On the other hand, when the detection result in step S426 indicates negation ("NO" in step S426), i.e. indicates that the ninth current value Id9 is more than the ninth threshold value Id9_th, the operation flow progresses to step S429.

In step S427, the current comparison section 61 detects whether the tenth current value Id10 is not more than the tenth threshold value Id10_th.

When the detection result in step S427 indicates affirmation ("YES" in step S427), i.e. indicates that the tenth current value Id10 is not more than the tenth threshold value Id10_th, the operation flow progresses to step S437.

On the other hand, when the detection result in step S427 indicates negation ("NO" in step S427), i.e. indicates that the tenth current value Id10 is more than the tenth threshold value Id10_th, the operation flow progresses to step S428.

In step S428, the abnormality judgment section 62 judges that the V phase current sensor 72 is not operating normally, i.e. has failed. The operation flow progresses to step S208.

In step S429, the abnormality judgment section 62 judges that the V phase current sensor 72 is operating normally, i.e. has not failed, and the U phase current sensor 71 or the W phase current sensor 73 is not operating normally, i.e. has failed. The operation flow progresses to step S430.

In step S430, the PWM instruction correction section 63 selects one of the U phase duty value Du and the W phase duty value Dw which is closest to 50%.

Further, the PWM instruction correction section 63 corrects one of the U phase duty value Du and the W phase duty value Dw which is closest to 50% so that one having duty value closet to 50% crosses to the central value of the PWM reference signal P. The operation flow progresses to step S431.

In step S431, the current comparison section 61 acquires again the bus current Ig, and the three phase currents Iu, Iv and Iw, i.e. the U phase current Iu, the V phase current Iv, the W phase current, and executes the comparison process previously described.

Similar to the process in step S407, the abnormality judgment section 62 detects and specifies which of the U phase current sensor 71 and the W phase current sensor 73 has failed on the basis of the comparison results executed by the current comparison section 61.

When the abnormality judgment section 62 determines that the U phase current sensor 71 has failed, the operation flow progresses to step S207.

On the other hand, when the abnormality judgment section 62 determines that the W phase current sensor 73 has failed, the operation flow progresses to step S209.

In step S432, the current comparison section 61 detects whether the eleventh current value Id11 is not more than the eleventh threshold value Id11_th.

When the detection result in step S432 indicates affirmation ("YES" in step S432), i.e. indicates that the eleventh current value Id11 is not more than the eleventh threshold value Id11_th, the operation flow progresses to step S433.

On the other hand, when the detection result in step S432 indicates negation ("NO" in step S432), i.e. indicates that the eleventh current value Id11 is more than the eleventh threshold value Id11_th, the operation flow progresses to step S437.

In step S433, the current comparison section 61 detects whether the twelfth current value Id12 is not more than the twelfth threshold value Id12_th.

When the detection result in step S433 indicates affirmation ("YES" in step S433), i.e. indicates that the twelfth current value Id12 is not more than the twelfth threshold value Id12_th, the operation flow progresses to step S437.

On the other hand, when the detection result in step S433 indicates negation ("NO" in step S433), i.e. indicates that the twelfth current value Id12 is more than the twelfth threshold value Id12_th, the operation flow progresses to step S434.

In step S434, the abnormality judgment section 62 judges that the U phase current sensor 71 is operating normally, i.e. has not failed, and the V phase current sensor 72 or the W phase current sensor 73 is not operating normally, i.e. has failed. The operation flow progresses to step S417.

In step S435, the PWM instruction correction section 63 selects one of the V phase duty value Dv and the W phase duty value Dw which is closest to 50%.

Further, the PWM instruction correction section 63 corrects one of the V phase duty value Dv and the W phase duty value Dw which is closest to 50% so that one having duty value closet to 50% crosses to the central value of the PWM reference signal P. The operation flow progresses to step S436.

In step S436, the current comparison section 61 acquires again the bus current Ig, and the three phase currents Iu, Iv and Iw, i.e. the U phase current Iu, the V phase current Iv, the W phase current, and executes the comparison process previously described.

Similar to the process in step S407, the abnormality judgment section 62 detects and specifies which of the V phase current sensor 72 and the W phase current sensor 73 has failed on the basis of the comparison results executed by the current comparison section 61.

When the abnormality judgment section 62 determines that the V phase current sensor 72 has failed, the operation flow progresses to step S208.

On the other hand, when the abnormality judgment section 62 determines that the W phase current sensor 73 has failed, the operation flow progresses to step S209.

In step S437, the abnormality judgment section 62 determines occurrence of a possible abnormality case in which two current sensors selected from the U phase current sensor 71, the V phase current sensor 72, the W phase current sensor 73 and the bus current sensor 74 are not operating normally, i.e. have failed. After the determination of the abnormality judgment section 62, the current sensor abnormality diagnosis device 60 stops executing the abnormality diagnosis process, and instructs the drive circuit 40 through the control section 55 in the EPS-ECU 50 to stop the operation of the three phase AC motor 80.

In step S207, the control section 55 calculates the U phase current Iu by using the following equation (14), and transmits information regarding to the calculated U phase current Iu as one of the diagnostic signals SD to the control section 55. The operation flow progresses to step S204.

$$Iu = -Iv - Iw \quad (14).$$

In step S208, the control section 55 calculates a value of the V phase current Iv by using the following equation (15), and transmits information regarding to the calculated V phase current Iv as one of the diagnostic signals SD to the control section 55. The operation flow progresses to step S204.

$$Iv = -Iu - Iw \quad (15).$$

In step S209, the control section 55 calculates a value of the W phase current Iw by using the following equation (16), and transmits information regarding to the calculated W phase current Iv as one of the diagnostic signals SD to the control section 55. The operation flow progresses to step S204.

$$Iw = -Iu - Iv \quad (16).$$

In step S204 after steps 207 to step S209, the control section 55 executes the feedback process by using the equations (14), (15) and (16), and using the three phase currents Iu, Iv and Iw. The current sensor abnormality diagnosis device 60 finishes the processes shown in FIG. 8 to FIG. 12.

The current sensor abnormality diagnosis device 60 stores abnormality information into the memory section such as RAM when detecting one or more current sensors in the phase current sensors 71-73 and the bus current sensor 74 has failed. The abnormality information contains information regarding which of the phase current sensors 71-73 and the bus current sensor 74 has failed.

A description will now be given of the abnormality diagnosis process, to detect whether which of the phase current sensors 71-73 has failed, executed by the current sensor abnormality diagnosis device 60 with reference to the flow chart shown in FIG. 13.

Figure 13:
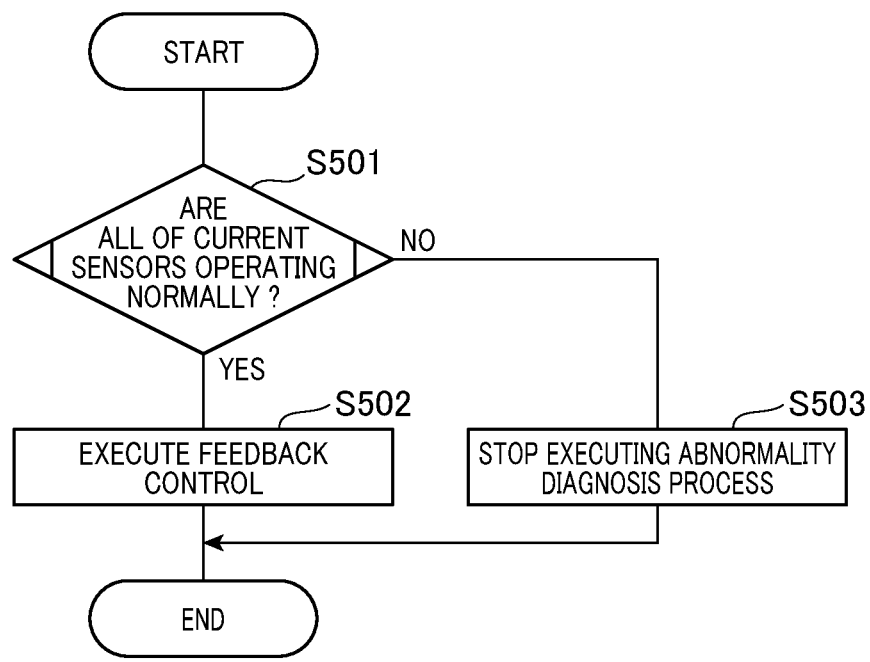
FIG. 13 is a flow chart explaining an abnormality diagnosis process executed by the current sensor abnormality diagnosis device according to the exemplary embodiment shown in FIG. 1 when one of phase current sensors is not operating normally.

FIG. 13 is a flow chart explaining the abnormality diagnosis process executed by the current sensor abnormality diagnosis device 60 according to the exemplary embodiment shown in FIG. 1 when one of the phase current sensors 71-73 has failed.

In step S501 shown in FIG. 13, the abnormality judgment section 62 determines whether all of the phase current sensors 71-73 and the bus current sensor 74, i.e. the U phase current sensor 71, the V phase current sensor 72, the W phase current sensor 73 and the bus current sensor 74 are operating normally, i.e. have not failed on the comparison results by the current comparison section 61.

When the detection result indicates affirmation ("YES" in step S501), i.e. the abnormality judgment section 62 determines that all of the phase current sensors 71-73 and the bus current sensor 74 are operating normally, i.e. have not failed. The operation flow progresses to step S502.

On the other hand, when the detection result indicates negation ("NO" in step S501), i.e. the abnormality judgment section 62 determines that one of the phase current sensors 71-73 and the bus current sensor 74 is not operating normally, i.e. has failed. The operation flow progresses to step S503.

A description will now be given of the detailed explanation of the process in step S501 executed by the abnormality judgment section 62 with reference to FIG. 14 and FIG. 15.

Figure 14:
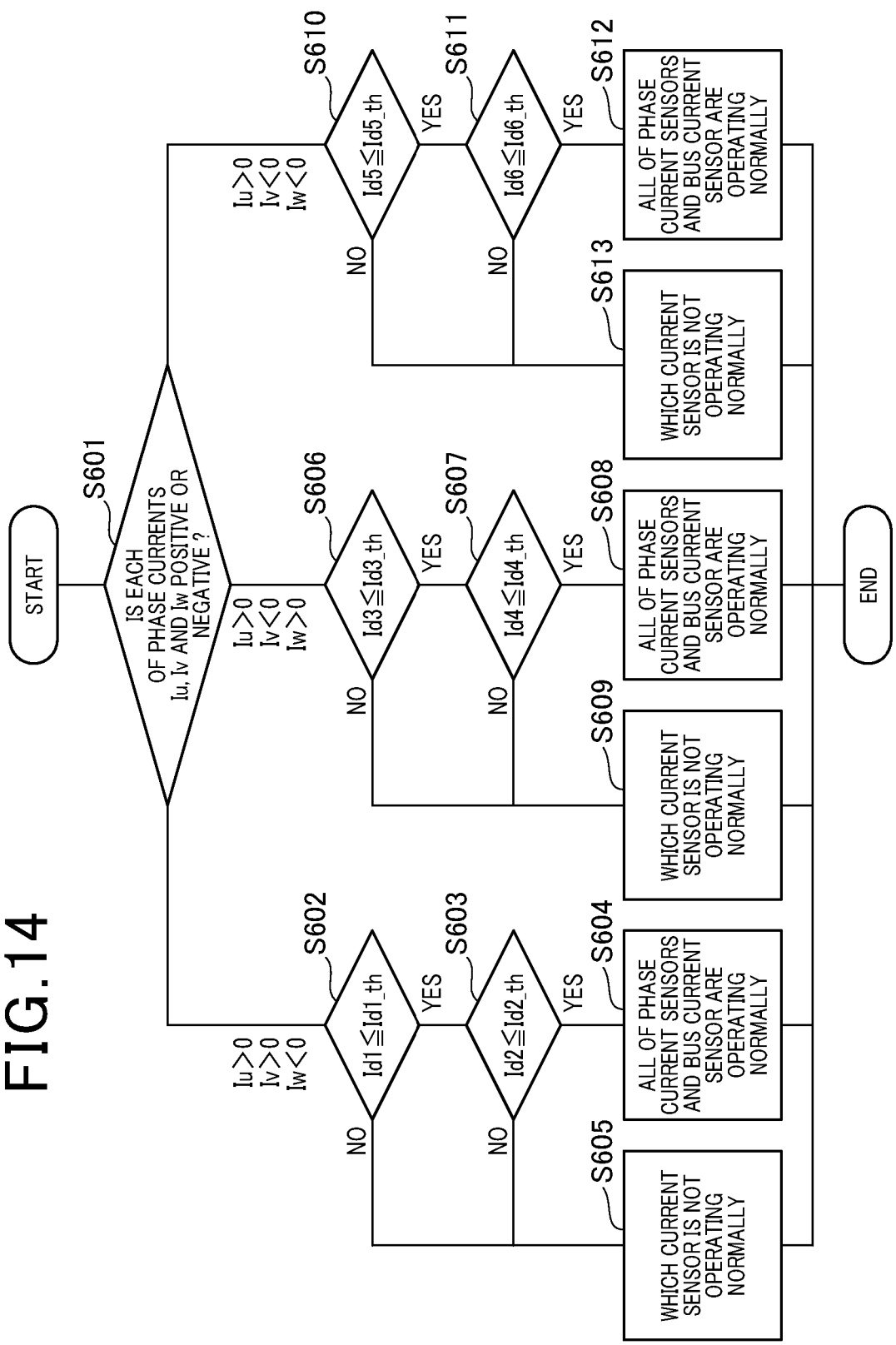
FIG. 14 is a sub-flow chart explaining the abnormality diagnosis process executed by the current sensor abnormality diagnosis device according to the exemplary embodiment shown in FIG. 1 when one of phase current sensors is not operating normally.

FIG. 14 is a sub-flow chart explaining the abnormality diagnosis process executed by the executed by the abnormality judgment section 62 when one of the phase current sensors 71-73 has failed. FIG. 15 is another sub-flow chart explaining the abnormality diagnosis process executed by the current comparison section 61 when one of the phase current sensors 71-73 has failed.

Figure 15:
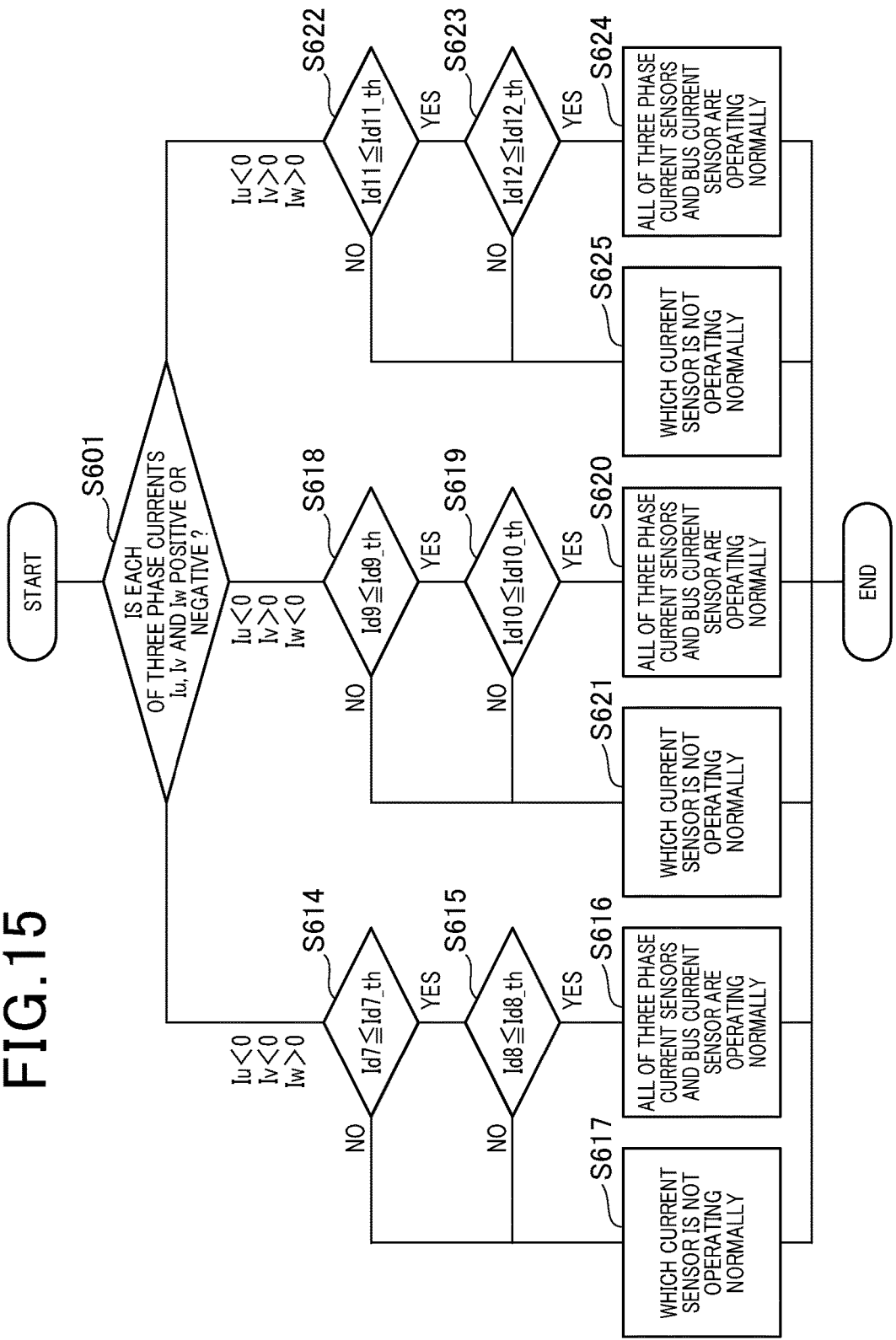
FIG. 15 is another sub-flow chart explaining the abnormality diagnosis process executed by the current sensor abnormality diagnosis device according to the exemplary embodiment shown in FIG. 1 when one of phase current sensors is not operating normally.

In step S601 shown in FIG. 14 and FIG. 15, the current comparison section 61 detects whether each of the three phase currents Iu, Iv and Iw, i.e. the U phase current Iu, the V phase current Iv, the W phase current is a positive value or a negative value.

When the current comparison section 61 detects that the U phase current Iu is a positive value, the V phase current Iv is a positive value, and the W phase current is a negative value, the operation flow progresses to step S602 shown in FIG. 14.

On the other hand, when the current comparison section 61 detects that the U phase current Iu is a positive value, the V phase current Iv is a negative value, and the W phase current is a positive value, the operation flow progresses to step S606 shown in FIG. 14.

Further, when the current comparison section 61 detects that the U phase current Iu is a positive value, the V phase current Iv is a negative value, and the W phase current is a negative value, the operation flow progresses to step S610 shown in FIG. 14.

Further, when the current comparison section 61 detects that the U phase current Iu is a negative value, the V phase current Iv is a negative value, and the W phase current is a positive value, the operation flow progresses to step S614 shown in FIG. 15.

Still further, when the current comparison section 61 detects that the U phase current Iu is a negative value, the V phase current Iv is a positive value, and the W phase current is a negative value, the operation flow progresses to step S618 shown in FIG. 15.

Still further, when the current comparison section 61 detects that the U phase current Iu is a negative value, the V phase current Iv is a positive value, and the W phase current is a positive value, the operation flow progresses to step S622 shown in FIG. 15.

In step S602 shown in FIG. 14, the current comparison section 61 detects whether the first current value Id1 is not more than the first threshold value Id1_th.

When the detection result in step S602 indicates affirmation ("YES" in step S602), i.e. indicates that the first current value Id1 is not more than the first threshold value Id1_th, the operation flow progresses to step S603.

On the other hand, when the detection result in step S602 indicates negation ("NO" in step S602), i.e. indicates that the first current value Id1 is more than the first threshold value Id1_th, the operation flow progresses to step S605.

In step S603 shown in FIG. 14, the current comparison section 61 detects whether the second current value Id2 is not more than the second threshold value Id2_th.

When the detection result in step S603 indicates affirmation ("YES" in step S603), i.e. indicates that the second current value Id2 is not more than the second threshold value Id2_th, the operation flow progresses to step S604.

On the other hand, when the detection result in step S603 indicates negation ("NO" in step S603), i.e. indicates that the second current value Id2 is more than the second threshold value Id2_th, the operation flow progresses to step S605.

In step S604 shown in FIG. 14, the abnormality judgment section 62 judges that all of the phase current sensors 71-73 and the bus current sensor 74 are operating normally, i.e. have not failed. The operation flow progresses to step S502.

In step 605 shown in FIG. 14, the abnormality judgment section 62 judges that each of the phase current sensors 71-73 and the bus current sensor 74 has failed. The operation flow progresses to step S503.

In step S606 shown in FIG. 14, the current comparison section 61 detects whether the third current value Id3 is not more than the third threshold value Id3_th.

When the detection result in step S606 indicates affirmation ("YES" in step S606), i.e. indicates that the third current value Id3 is not more than the third threshold value Id3_th, the operation flow progresses to step S307.

On the other hand, when the detection result in step S606 indicates negation ("NO" in step S606), i.e. indicates that the third current value Id3 is more than the third threshold value Id3_th, the operation flow progresses to step S609.

In step S607 shown in FIG. 14, the current comparison section 61 detects whether the fourth current value Id4 is not more than the fourth threshold value Id4_th.

When the detection result in step S607 indicates affirmation ("YES" in step S607), i.e. indicates that the fourth current value Id4 is not more than the fourth threshold value Id4_th, the operation flow progresses to step S608.

On the other hand, when the detection result in step S607 indicates negation ("NO" in step S607), i.e. indicates that the fourth current value Id4 is more than the fourth threshold value Id4_th, the operation flow progresses to step S609.

In step S608 shown in FIG. 14, the abnormality judgment section 62 judges that all of the phase current sensors 71-73 and the bus current sensor 74 are operating normally, i.e. have not failed. The operation flow progresses to step S502.

In step S609 shown in FIG. 14, the abnormality judgment section 62 judges that each of the phase current sensors 71-73 and the bus current sensor 74 has failed. The operation flow progresses to step S503.

In step S610 shown in FIG. 14, the current comparison section 61 detects whether the fifth current value Id5 is not more than the fifth threshold value Id5_th.

When the detection result in step S610 indicates affirmation ("YES" in step S610), i.e. indicates that the fifth current value Id5 is not more than the fifth threshold value Id5_th, the operation flow progresses to step S611.

On the other hand, when the detection result in step S610 indicates negation ("NO" in step S610), i.e. indicates that the fifth current value Id5 is more than the fifth threshold value Id5_th, the operation flow progresses to step S613.

In step S611 shown in FIG. 14, the current comparison section 61 detects whether the sixth current value Id6 is not more than the sixth threshold value Id6_th.

When the detection result in step S611 indicates affirmation ("YES" in step S611), i.e. indicates that the sixth current value Id6 is not more than the sixth threshold value Id6_th, the operation flow progresses to step S612.

On the other hand, when the detection result in step S611 indicates negation ("NO" in step S611), i.e. indicates that the sixth current value Id6 is more than the sixth threshold value Id6_th, the operation flow progresses to step S613.

In step S612 shown in FIG. 14, the abnormality judgment section 62 judges that all of the phase current sensors 71-73 and the bus current sensor 74 are operating normally, i.e. have not failed. The operation flow progresses to step S504.

In step S613, the abnormality judgment section 62 judges that one of the phase current sensors 71-73 and the bus current sensor 74 is not operating normally, i.e. has failed. The operation flow progresses to step S503.

In step S614 shown in FIG. 15, the current comparison section 61 detects whether the seventh current value Id7 is not more than the seventh threshold value Id7_th.

When the detection result in step S614 indicates affirmation ("YES" in step S614), i.e. indicates that the seventh current value Id7 is not more than the seventh threshold value Id7_th, the operation flow progresses to step S615.

On the other hand, when the detection result in step S614 indicates negation ("NO" in step S614), i.e. indicates that the seventh current value Id7 is more than the seventh threshold value Id7_th, the operation flow progresses to step S617.

In step S615 shown in FIG. 15, the current comparison section 61 detects whether the eighth current value Id8 is not more than the eighth threshold value Id8_th.

When the detection result in step S615 indicates affirmation ("YES" in step S615), i.e. indicates that the eighth current value Id8 is not more than the eighth threshold value Id8_th, the operation flow progresses to step S616.

On the other hand, when the detection result in step S615 indicates negation ("NO" in step S615), i.e. indicates that the eighth current value Id8 is more than the eighth threshold value Id8_th, the operation flow progresses to step S617.

In step S616 shown in FIG. 15, the abnormality judgment section 62 judges that all of the phase current sensors 71-73 and the bus current sensor 74 are operating normally, i.e. have not failed. The operation flow progresses to step S502.

In step S317, the abnormality judgment section 62 judges that one of the phase current sensors 71-73 and the bus current sensor 74 is not operating normally, i.e. has failed. The operation flow progresses to step S503.

In step S618 shown in FIG. 10, the current comparison section 61 detects whether the ninth current value Id9 is not more than the ninth threshold value Id9_th.

When the detection result in step S618 indicates affirmation ("YES" in step S618), i.e. indicates that the ninth current value Id9 is not more than the ninth threshold value Id9_th, the operation flow progresses to step S619.

On the other hand, when the detection result in step S618 indicates negation ("NO" in step S618), i.e. indicates that the ninth current value Id9 is more than the ninth threshold value Id9_th, the operation flow progresses to step S621.

In step S619 shown in FIG. 15, the current comparison section 61 detects whether the tenth current value Id10 is not more than the tenth threshold value Id10_th.

When the detection result in step S619 indicates affirmation ("YES" in step S619), i.e. indicates that the tenth current value Id10 is not more than the tenth threshold value Id10_th, the operation flow progresses to step S620.

On the other hand, when the detection result in step S619 indicates negation ("NO" in step S619), i.e. indicates that the tenth current value Id10 is more than the tenth threshold value Id10_th, the operation flow progresses to step S621.

In step S620 shown in FIG. 15, the abnormality judgment section 62 judges that all of the phase current sensors 71-73 and the bus current sensor 74 are operating normally, i.e. have not failed. The operation flow progresses to step S502.

In step S621, the abnormality judgment section 62 judges that one of the phase current sensors 71-73 and the bus current sensor 74 is not operating normally, i.e. has failed. The operation flow progresses to step S503.

In step S622 shown in FIG. 15, the current comparison section 61 detects whether the eleventh current value Id11 is not more than the eleventh threshold value Id11_th.

When the detection result in step S622 indicates affirmation ("YES" in step S622), i.e. indicates that the eleventh current value Id11 is not more than the eleventh threshold value Id11_th, the operation flow progresses to step S623.

On the other hand, when the detection result in step S622 indicates negation ("NO" in step S622), i.e. indicates that the eleventh current value Id11 is more than the eleventh threshold value Id11_th, the operation flow progresses to step S624.

In step S623 shown in FIG. 15, the current comparison section 61 detects whether the twelfth current value Id12 is not more than the twelfth threshold value Id12_th.

When the detection result in step S623 indicates affirmation ("YES" in step S623), i.e. indicates that the twelfth current value Id12 is not more than the twelfth threshold value Id12_th, the operation flow progresses to step S624.

On the other hand, when the detection result in step S623 indicates negation ("NO" in step S623), i.e. indicates that the twelfth current value Id12 is more than the twelfth threshold value Id12_th, the operation flow progresses to step S625.

In step S624 shown in FIG. 15, the abnormality judgment section 62 judges that all of the phase current sensors 71-73 and the bus current sensor 74 are operating normally, i.e. have not failed. The operation flow progresses to step S503.

In step S625 shown in FIG. 15, the abnormality judgment section 62 judges that one of the phase current sensors 71-73 and the bus current sensor 74 is not operating normally, i.e. has failed. The operation flow progresses to step S503.

In step S502 shown in FIG. 13, the control section 55 executes the feedback control on the basis of the three phase currents Iu, Iv and Iw, i.e. the U phase current Iu, the V phase current Iv, the W phase current.

In step S503 shown in FIG. 13, the current sensor abnormality diagnosis device 60 finishes the execution of the abnormality diagnosis process, and instructs the drive circuit 40 through the control section 55 in the EPS-ECU 50 to stop the operation of the three phase AC motor 80.

A description will now be given of the process performed by the current sensor abnormality diagnosis device 60 when the bus current sensor 74 has failed with reference to FIG. 16.

Figure 16:
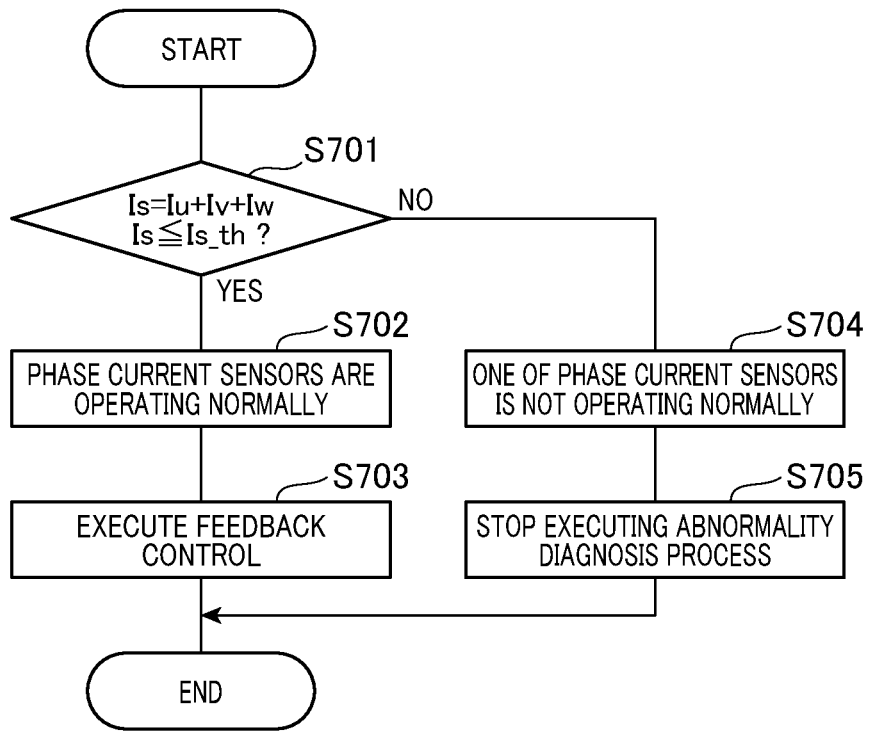
FIG. 16 is a flow chart explaining abnormality diagnosis process executed by the current sensor abnormality diagnosis device according to the exemplary embodiment shown in FIG. 1 when a bus current sensor is not operating normally.

FIG. 16 is a flow chart explaining abnormality diagnosis process executed by the current sensor abnormality diagnosis device 60 according to the exemplary embodiment shown in FIG. 1 when the bus current sensor 74 is not operating normally, i.e. has failed.

In step S701 shown in FIG. 16, the current comparison section 61 detects whether the three phase current sum Is is not more than the three phase current sum threshold value Is_th.

When the detection result in step S701 indicates affirmation ("YES" in step S701), i.e. indicates that the three phase current sum Is is not more than the three phase current sum threshold value Is_th, the operation flow progresses to step S702.

On the other hand, when the detection result in step S701 indicates negation ("NO" in step S701), i.e. indicates that the three phase current sum Is is more than the three phase current sum threshold value Is_th, the operation flow progresses to step S704.

In step S702, the abnormality judgment section 62 judges that all of the U phase current sensor 71, the V phase current sensor 72, the W phase current sensor 73 are operating normally. The operation flow progresses to step S703.

In step S703, the control section 55 executes the feedback control on the basis of the three phase currents Iu, Iv and Iw. The current sensor abnormality diagnosis device 60 finishes the abnormality diagnosis process shown in FIG. 16.

In step S704, the abnormality judgment section 62 judges that one of the U phase current sensor 71, the V phase current sensor 72, the W phase current sensor 73 is not operating normally, i.e. has failed. The operation flow progresses to step S705.

In step S705 shown in FIG. 16, the current sensor abnormality diagnosis device 60 finishes the execution of the abnormality diagnosis process, and instructs the drive circuit 40 through the control section 55 in the EPS-ECU 50 to stop the operation of the three phase AC motor 80.

Effects

A description will now be given of the effects of the current sensor abnormality diagnosis device 60 according to the exemplary embodiment.

[1] The current sensor abnormality diagnosis device 60 according to the exemplary embodiment compares the three phase currents Iu, Iv, Iw, and the bus current Ig in addition to the three phase current sum Is. This structure of the current sensor abnormality diagnosis device 60 makes it possible to quickly detect occurrences of various types of abnormality, for example, to detect an abnormality of the current sensor when a detection value of the current sensor becomes an undefined value due to occurrence of a circuit short or a power source short. Further, this structure of the current sensor abnormality diagnosis device 60 makes it possible to correctly adjust behavior of the three phase AC motor 80.

[2] Because the current sensor abnormality diagnosis device 60 can speedy detect a current sensor which has failed, it is possible to operate while estimating an output value of the failed current sensor. Further, because the current sensor abnormality diagnosis device 60 correctly detects occurrence of two current sensor have failed simultaneously, it is possible to allow the three phase AC motor 80 to continuously operate while keeping safe operation.

[3] In a case in which a timing when the bus current sensor 74 detects a current flowing in the bus line 64 is immediately following a timing when the switching elements 31-36 are turned on/off, the PWM instruction correction section 63 corrects each of the U phase duty value Du, the V phase duty value Dv and the W phase duty value Dw. This makes it possible to correctly detect the bus current Ig by using the phase current sensors 71-73 while eliminating influence of generated ringing.

Other Modifications

The concept of the present invention is not limited by the exemplary embodiments previously described.

FIG. 17 is a view showing a schematic structure of an electric power steering device as a motor drive system according to a modification of the exemplary embodiment.

(i) As shown in FIG. 17, it is acceptable for the bus current sensor 74 to be connected to a node of a bus line 86 between the battery 20 and the inverter 30. This structure makes it possible to provide the same effects of the current sensor abnormality diagnosis device 60 according to the exemplary embodiment previously described.

(ii) Further, it is acceptable for the current sensor abnormality diagnosis device 60 to have a voltage booster for increasing a DC voltage of the battery so as to supply a boosted voltage to the inverter 30.

Figure 18:
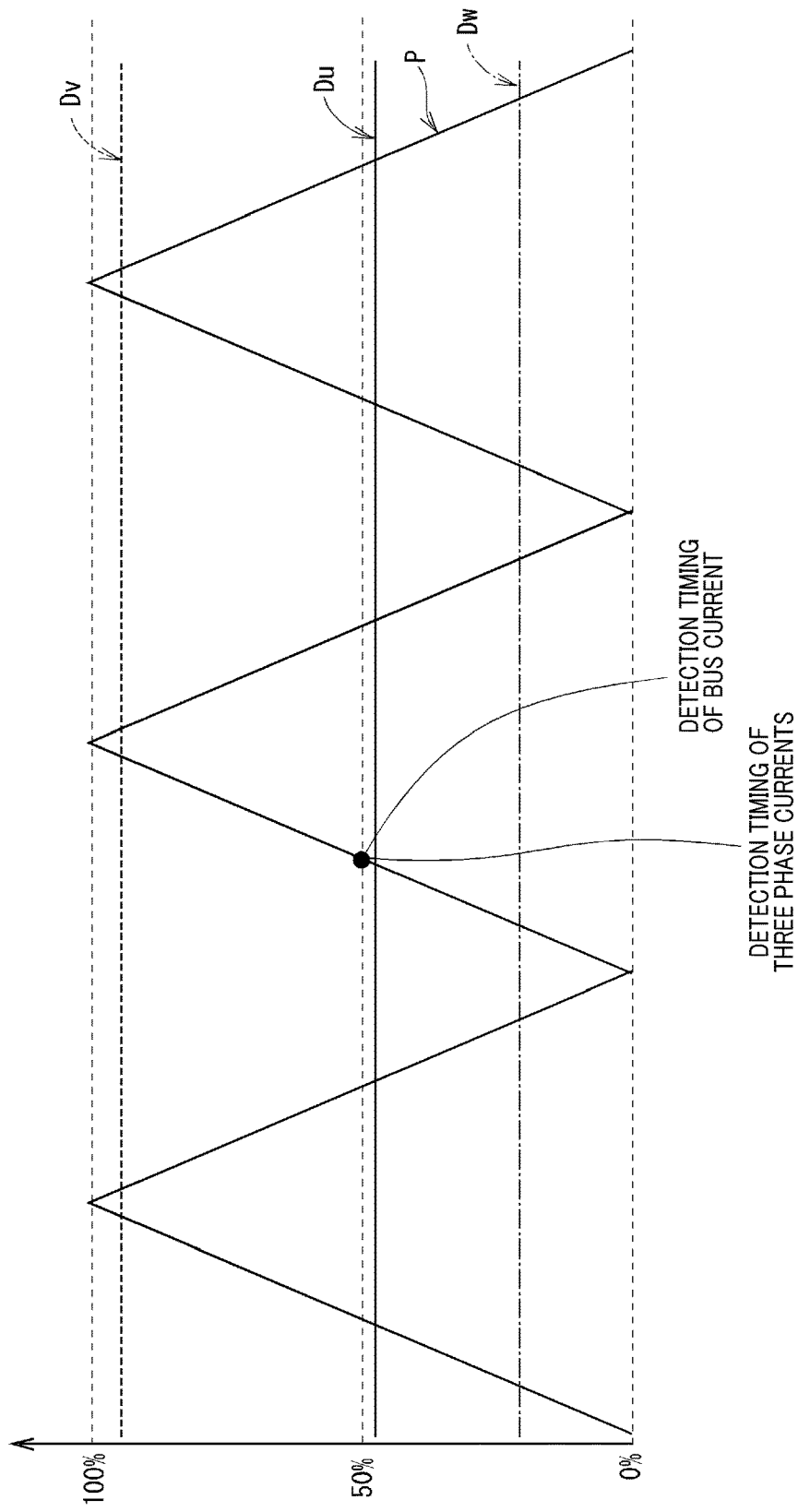
FIG. 18 is a view showing a detection timing of the phase current sensor and a detection timing of the bus current sensor in the motor drive system according to the modification of the exemplary embodiment shown in FIG. 17.

(iii) FIG. 18 is a view showing a detection timing of the phase current sensors 71-73 and a detection timing of the bus current sensor 74 in the motor drive system according to the modification of the exemplary embodiment shown in FIG. 17.

As shown in FIG. 18, it is acceptable for the current sensor abnormality diagnosis device 60 to have a structure in which the phase current sensors 71-73 and the bus current sensor 74 simultaneously detect the current which flows the corresponding current electrical passage 81, 82 or 83 and the bus line 84.

Further, it is acceptable for the phase current sensors 71-73 and the bus current sensor 74 to have a detection timing which is changed by the PWM control of the control section 55, instead of using a fix timing.

(iv) It is acceptable to apply the current sensor abnormality diagnosis device 60 according to the exemplary embodiment to various types of multi-phase AC motors in addition to the three phase AC motor.

(v) It is acceptable for the current sensor abnormality diagnosis device 60 to execute the temperature control of the phase current sensors 71-73 and the bus current sensor 74 on the basis of a temperature of a circuit board on which the inverter 30 is mounted. It is possible to increase the current detection accuracy of the phase current sensors 71-73 and the bus current sensor 74 by executing the temperature compensation.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A current sensor abnormality diagnosis device capable of detecting occurrence of abnormality of each of plural phase current sensors and a bus current sensor, the plural phase current sensors detecting three phase currents which flow in three phases of a three phase alternating current motor, the bus current sensor detecting a bus current which flows in a bus line, one terminal of the bus line being connected to a direct current power source or being earthed, the current sensor abnormality diagnosis device comprising a computer system including a central processing unit, the computer system being configured to provide:
a current comparison section which compares a three phase current sum with a predetermined three phase current threshold value and compares each of the three phase currents with the bus current, where the three phase current sum being a sum of the three phase currents; and
an abnormality judgment section which executes abnormality diagnosis of the phase current sensors or the bus current sensor, and the abnormality judgment section detecting that one of the phase current sensors has failed when the three phase current sum is not more than the predetermined three phase current threshold value, the abnormality judgment section determining whether the bus current sensor is operating normally on the basis of the comparison result of the three phase currents and the bus current, and the abnormality judgment section determining that one of the phase current sensors has failed on the basis of the comparison result between the three phase currents and the bus current when the three phase current sum is more than the predetermined three phase current threshold value.

2. The current sensor abnormality diagnosis device according to claim 1, further comprising a control section which executes feedback control of the three phase alternating current motor on the basis of the three phase currents detected by the phase current sensors, wherein
when the abnormality judgment section detects one of the three phase current sensors has failed, the control section estimates a detection current of the phase current sensor, which has failed, on the basis of the currents detected by the remaining phase current sensors which is operating normally,
when the abnormality judgment section detects that at least one of the phase current sensors has failed, and the bus current sensor has failed, the control section stops operating of the three phase alternating current motor.

3. The current sensor abnormality diagnosis device according to claim 2, wherein the current comparison section executes the comparison of the three phase currents and the bus current on the basis of a positive value and a negative value of each of the three phase currents.

4. The current sensor abnormality diagnosis device according to claim 2, further comprising plural switching elements which are turned on/off to supply an electric power to the three phase alternating current motor, wherein
the abnormality judgment section halts the execution of the abnormality diagnosis of the phase current sensors and the bus current sensor when the plural switching elements are turned on/off.

5. The current sensor abnormality diagnosis device according to claim 4, further comprising:
a pulse width modulation instruction value calculation section which executes the feedback control of the three phase currents, and calculates pulse width modulation values regarding the electric power to be supplied to the three phase alternating current motor;
a pulse signal generation section which generates a pulse width modulation reference signal which corresponds to the pulse width modulation values; and
a pulse width instruction correction section which corrects the pulse width modulation values when the plural switching elements are turned on/off.

6. The current sensor abnormality diagnosis device according to claim 4, further comprising:
a pulse width modulation instruction value calculation section which executes the feedback control of the three phase currents, and calculates pulse width modulation values regarding the electric power to be supplied to the three phase alternating current motor;
a pulse signal generation section which generates a pulse width modulation reference signal which corresponds to the pulse width modulation values; and
a pulse width instruction correction section which corrects the pulse width modulation values to exceed or to be below a central value of the pulse width modulation reference signal when the abnormality judgment section detects that one of the phase current sensors has failed.

7. The current sensor abnormality diagnosis device according to claim 2, wherein a timing when the phase current sensors detect the three phase currents is equal to a timing when the bus current sensor detects the bus current.

8. The current sensor abnormality diagnosis device according to claim 2, wherein a timing when the phase current sensors detect the three phase currents is different a timing when the bus current sensor detects the bus current.

9. The current sensor abnormality diagnosis device according to claim 1, wherein the current comparison section executes the comparison of the three phase currents and the bus current on the basis of a positive value and a negative value of each of the three phase currents.

10. The current sensor abnormality diagnosis device according to claim 1, further comprising plural switching elements which are turned on/off to supply an electric power to the three phase alternating current motor, wherein
the abnormality judgment section halts the execution of the abnormality diagnosis of the phase current sensors and the bus current sensor when the plural switching elements are turned on/off.

11. The current sensor abnormality diagnosis device according to claim 10, further comprising:
a pulse width modulation instruction value calculation section which executes the feedback control of the three phase currents, and calculates pulse width modulation values regarding the electric power to be supplied to the three phase alternating current motor;
a pulse signal generation section which generates a pulse width modulation reference signal which corresponds to the pulse width modulation values; and
a pulse width instruction correction section which corrects the pulse width modulation values when the plural switching elements are turned on/off.

12. The current sensor abnormality diagnosis device according to claim 10, further comprising:
a pulse width modulation instruction value calculation section which executes the feedback control of the three phase currents, and calculates pulse width modulation values regarding the electric power to be supplied to the three phase alternating current motor;
a pulse signal generation section which generates a pulse width modulation reference signal which corresponds to the pulse width modulation values; and
a pulse width instruction correction section which corrects the pulse width modulation values to exceed or to be below a central value of the pulse width modulation reference signal when the abnormality judgment section detects that one of the phase current sensors has failed.

13. The current sensor abnormality diagnosis device according to claim 1, wherein a timing when the phase current sensors detect the three phase currents is equal to a timing when the bus current sensor detects the bus current.

14. The current sensor abnormality diagnosis device according to claim 1, wherein a timing when the phase current sensors detect the three phase currents is different a timing when the bus current sensor detects the bus current.

* * * * *